United States Patent
Baligh et al.

(10) Patent No.: US 10,680,855 B2
(45) Date of Patent: Jun. 9, 2020

(54) MEASUREMENT IN NON-CELLULAR WIRELESS NETWORKS

(71) Applicants: Mohammadhadi Baligh, Ottawa (CA); Keyvan Zarifi, Ottawa (CA); Jianglei Ma, Ottawa (CA); Kelvin Kar Kin Au, Kanata (CA)

(72) Inventors: Mohammadhadi Baligh, Ottawa (CA); Keyvan Zarifi, Ottawa (CA); Jianglei Ma, Ottawa (CA); Kelvin Kar Kin Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/588,499

(22) Filed: May 5, 2017

(65) Prior Publication Data

US 2017/0331645 A1 Nov. 16, 2017

Related U.S. Application Data

(60) Provisional application No. 62/336,240, filed on May 13, 2016.

(51) Int. Cl.
   *H04L 25/02*  (2006.01)
   *H04L 27/26*  (2006.01)
   *H04L 5/00*   (2006.01)

(52) U.S. Cl.
   CPC ........ *H04L 25/0226* (2013.01); *H04L 5/0023* (2013.01); *H04L 5/0041* (2013.01); *H04L 5/0051* (2013.01); *H04L 27/2613* (2013.01)

(58) Field of Classification Search
CPC . H04L 25/0226; H04L 5/0023; H04L 5/0041; H04L 5/0051; H04L 27/2613
See application file for complete search history.

(56) References Cited

U.S. PATENT DOCUMENTS

| | | | |
|---|---|---|---|
| 9,853,786 B2 * | 12/2017 | Seo | ........................ H04L 5/0048 |
| 2012/0076106 A1 | 3/2012 | Bhattad et al. | |
| 2013/0070719 A1 | 3/2013 | Xu et al. | |
| 2013/0114535 A1 | 5/2013 | Ng et al. | |
| 2013/0194943 A1 | 8/2013 | Davydov | |
| 2013/0223264 A1 | 8/2013 | Miki et al. | |
| 2014/0119317 A1 | 5/2014 | Kim et al. | |
| 2015/0003271 A1 | 1/2015 | Park et al. | |
| 2015/0162966 A1 | 6/2015 | Kim et al. | |

(Continued)

FOREIGN PATENT DOCUMENTS

| | | |
|---|---|---|
| CN | 102378114 A | 3/2012 |
| JP | 2012080421 A | 4/2012 |

(Continued)

OTHER PUBLICATIONS

"6.10.5 CSI Reference Signals", 3GPP TS 36. 211 V13. 1. 0 (Mar. 2016) [online], Mar. 29, 2016, pp. 122-128.

(Continued)

*Primary Examiner* — Michelle M Koeth

(57) ABSTRACT

Systems and methods of assigning channel state information-reference symbol (CSI-RS) ports to user equipment are provided. In addition resource configurations for transmission of CSI-RS are provided, and methods of mapping CSI-RS sequences to such resources are provided.

30 Claims, 18 Drawing Sheets

(56) References Cited

U.S. PATENT DOCUMENTS

| | | | |
|---|---|---|---|
| 2015/0208392 A1* | 7/2015 | Park | H04B 7/024 370/329 |
| 2016/0242060 A1 | 8/2016 | Kakishima et al. | |
| 2017/0019163 A1 | 1/2017 | Yoshimoto et al. | |
| 2017/0078072 A1 | 3/2017 | Kang et al. | |
| 2017/0202014 A1* | 7/2017 | Moon | H04B 7/0626 |
| 2017/0223667 A1 | 8/2017 | Yi et al. | |
| 2018/0070342 A1 | 3/2018 | Hoshino et al. | |
| 2018/0115357 A1* | 4/2018 | Park | H04B 7/04 |
| 2018/0279152 A1* | 9/2018 | Kim | H04B 7/0632 |

FOREIGN PATENT DOCUMENTS

| | | | |
|---|---|---|---|
| JP | 2014516235 A | 7/2014 | |
| JP | 2015070335 A | 4/2015 | |
| JP | 2017512443 A | 5/2017 | |
| WO | 2010106729 A1 | 9/2010 | |
| WO | 2015141619 A1 | 9/2015 | |
| WO | WO-2016122257 A1 * | 8/2016 | H04B 7/02 |

OTHER PUBLICATIONS

NEC, "Discussion on DRS enhancement for LAA [online]", 3GPP TSG RAN WG1 Meeting #82bis, R1-155276, Oct. 5-9, 2015, Malmö, Sweden, 4 pages.

Qualcomm Incorporated, "Further details on CSI-RS [online]", 3GPP TSG-RAN WG1 #60bis, R1-103288, May 10-14, 2010, Montreal, Canada, 12 pages.

* cited by examiner

MEASUREMENT IN NON-CELLULAR WIRELESS NETWORKS

CROSS REFERENCE TO RELATED APPLICATIONS

This application claims priority to U.S. Provisional Patent Application No. 62/336,240 entitled "Measurement in Non-Cellular Wireless Networks", filed May 13, 2016, which is hereby incorporated by reference in its entirety.

FIELD

The application relates to systems and methods for configurable sequence usage for transmission reception points.

BACKGROUND

In some modern network designs, the identity and location of network transmission reception points (TRPs) is not known to the user equipment (UEs) served by the network. A specific example is a UE-centric no-cell (UCNC) system in which multiple TRPs may serve a UE without the UE knowing which TRPs are serving it. This presents a challenge in terms of getting accurate channel measurements.

It is possible for the network to conduct measurements based on sounding reference symbols (SRS) transmitted by the UE. This is sufficient for measuring the uplink channel. If the uplink and downlink channels were reciprocal to a sufficient degree, this could also form the basis of an estimate of the downlink channel. However, in general, the uplink and downlink channels are not reciprocal. For example, the carrier frequency for the uplink and downlink may be different, the number of antennas for uplink vs. downlink transmission may be different, or the background noise and interference may be different.

Channel state information (CSI)-reference symbols (RS) may be transmitted by the network. The CSI-RSs contain pilot signals. The UE can measure these and report CSI data back to the network. In a hypercell, the same CSI-RS may be transmitted by a number of TRPs.

SUMMARY

Systems and methods of assigning channel state information-reference symbol (CSI-RS) ports to user equipment are provided. In addition resource configurations for transmission of CSI-RS are provided, and methods of mapping CSI-RS sequences to such resources are provided.

According to one aspect of the present invention, there is provided a method in a user equipment, the method comprising: receiving a CSI-RS sequence using an N×K CSI-RS resource, the N×K CSI-RS resource comprising N adjacent or non-adjacent OFDM symbols by K adjacent or non-adjacent PRBs. Advantageously, this method provides a flexible CSI-RS resource design.

Optionally, in the preceding embodiment, the N×K CSI-RS resource has repetitions of n consecutive OFDM symbol×k consecutive PRB CSI-RS resource components, wherein for each such CSI-RS resource component, the CSI-RS transmission makes use of $n_1$ out of the n OFDM symbols and makes use of $k_1$ out of the k PRBs.

Optionally, in any of the preceding embodiments, there is a separation between consecutive CSI-RS resource components of a CSI-RS resource in the time dimension and/or there is a separation between consecutive CSI-RS resource components of the CSI-RS resource in the frequency dimension.

Optionally, in any of the preceding embodiments, each CSI-RS resource component is formed of s CSI-RS resource component unit types, each CSI-RS resource component type having a respective number v of adjacent PRBs in the frequency domain and a respective number u of adjacent OFDM symbols in the time domain.

Optionally, in any of the preceding embodiments, the method further comprises: receiving a CSI-RS sequence mapped to a plurality of CSI-RS resource component units.

Optionally, in any of the preceding embodiments, the plurality of CSI-RS resource component units are of one CSI-RS resource component.

Optionally, in any of the preceding embodiments, plurality of CSI-RS resource component units are of multiple CSI-RS resource components.

Optionally, in any of the preceding embodiments, each CSI-RS sequence is generated using at least one sequence seed.

Optionally, in any of the preceding embodiments, the at least one sequence seed is network configurable.

Optionally, in any of the preceding embodiments, the at least one sequence seed is dependent upon cell identifier and/or at least one UE specific parameter.

Optionally, in any of the preceding embodiments, the CSI-RS sequence is scrambled using a cell specific sequence.

Optionally, in any of the preceding embodiments, CSI-RS sequence is scrambled using a UE specific sequence.

Optionally, in any of the preceding embodiments, multiple CSI-RS sequences are mapped to at least partially overlapping sets of CSI-RS resource component units, the multiple CSI-RS sequences being orthogonal or having low cross-correlation on the overlapping CSI-resource components.

Optionally, in any of the preceding embodiments, resource elements used for CSI-RS resource component units are dedicated to CSI-RS transmission and no data or control signal will be sent on these REs.

Optionally, in any of the preceding embodiments, the N by K CSI-RS resource is dedicated to CSI-RS transmission only.

Optionally, in any of the preceding embodiments, only those OFDM symbols in the time domain and PRBs in the frequency domain that include a part of a CSI-RS resource component are dedicated to CSI-RS transmission only, with remaining other PRBs and OFDM symbols on the time frequency plain that are covered by N by K CSI-RS resource available for use for transmission of data or control signalling.

Optionally, in any of the preceding embodiments, one or a combination of wideband, partial band, and narrowband CSI-RS resource allocations are configured.

Optionally, in any of the preceding embodiments, the method further comprises receiving an assignment of multiple CSI-RS resources with different configurations at different parts of the frequency band.

According to another aspect of the present invention, there is provided a method comprising: transmitting a CSI-RS sequence using an N×K CSI-RS resource, the N×K CSI-RS resource comprising N adjacent or non-adjacent OFDM symbols by K adjacent or non-adjacent PRBs. Advantageously, this method provides a flexible CSI-RS resource design.

Optionally, in the preceding embodiment, the N×K CSI-RS resource has repetitions of n consecutive OFDM symbol×k consecutive PRB CSI-RS resource components, wherein for each such CSI-RS resource component, the CSI-RS transmission makes use of $n_1$ out of the n OFDM symbols and makes use of $k_1$ out of the k PRBs.

Optionally, in any of the preceding embodiments, there is a separation between consecutive CSI-RS resource components of a CSI-RS resource in the time dimension and/or there is a separation between consecutive CSI-RS resource components of the CSI-RS resource in the frequency dimension.

Optionally, in any of the preceding embodiments, each CSI-RS resource component is formed of s CSI-RS resource component unit types, each CSI-RS resource component type having a respective number v of adjacent PRBs in the frequency domain and a respective number u of adjacent OFDM symbols in the time domain.

Optionally, in any of the preceding embodiments, the method further comprises: mapping a CSI-RS sequence to a plurality of CSI-RS resource component units.

Optionally, in any of the preceding embodiments, the plurality of CSI-RS resource component units are of one CSI-RS resource component.

Optionally, in any of the preceding embodiments, the plurality of CSI-RS resource component units are of multiple CSI-RS resource components.

Optionally, in any of the preceding embodiments, each CSI-RS sequence is generated using at least one sequence seed.

Optionally, in any of the preceding embodiments, the at least one sequence seed is network configurable.

Optionally, in any of the preceding embodiments, the at least one sequence seed is dependent upon cell identifier and/or at least one UE specific parameter.

Optionally, in any of the preceding embodiments, the method further comprises: further scrambling the CSI-RS sequence using a cell specific sequence.

Optionally, in any of the preceding embodiments, the method further comprises: further scrambling the CSI-RS sequence using a UE specific sequence.

Optionally, in any of the preceding embodiments, the method further comprises mapping multiple CSI-RS sequences to at least partially overlapping sets of CSI-RS resource component units, the multiple CSI-RS sequences being orthogonal or having low cross-correlation on the overlapping CSI-resource components.

Optionally, in any of the preceding embodiments, resource elements used for CSI-RS resource component units are dedicated to CSI-RS transmission and no data or control signal will be sent on these REs.

Optionally, in any of the preceding embodiments, the N by K CSI-RS resource is dedicated to CSI-RS transmission only.

Optionally, in any of the preceding embodiments, only those OFDM symbols in the time domain and PRBs in the frequency domain that include a part of a CSI-RS resource component are dedicated to CSI-RS transmission only, with remaining other PRBs and OFDM symbols on the time frequency plain that are covered by N by K CSI-RS resource available for use for transmission of data or control signalling.

Optionally, in any of the preceding embodiments, the method further comprises configuring one or a combination of wideband, partial band, and narrowband CSI-RS resource allocations.

Optionally, in any of the preceding embodiments, the method further comprises assigning a UE multiple CSI-RS resources with different configurations at different parts of the frequency band.

According to another aspect of the present invention, there is provided a method comprising: grouping each of a plurality of UEs to one of a plurality of groups, based on one or more factors; for each group of UEs, allocating a determined set of channel state information—reference symbol (CSI-RS) ports to be shared by the group of user equipments (UEs); at least one TRP serving each group of UEs transmitting CSI-RS on the determined set of CSI-RS ports. This provides a method of CSI-RS port allocation that is group-based.

Optionally, in any of the preceding embodiments, the grouping is virtual TRP point (VTRP)-based, a VTRP comprising a group of transmission reception points (TRPS) that collectively serve a group of UEs.

Optionally, in any of the preceding embodiments, each VTRP has a VTRP identifier, the method further comprises: signaling a VTRP identifier to each UE served by the VTRP; associating a set of CSI-RS ports with each VTRP identifier.

Optionally, in any of the preceding embodiments, the set of CSI-RS ports is derivable from the VTRP identifier.

Optionally, in any of the preceding embodiments, the method further comprises: spatially reusing VTPP identifiers and CSI-RS ports.

Optionally, in any of the preceding embodiments, the grouping is location-based.

Optionally, in any of the preceding embodiments, the method further comprises: sending each UE a UE identifier that includes a field that encodes a location of the UE; associating a set of CSI-RS ports with each location;

Optionally, in any of the preceding embodiments, the method further comprises changing the set of CSI-RS ports the UE is to measure and report on by changing the UE's UE identifier.

Optionally, in any of the preceding embodiments, the method further comprises spatially reusing values of the location for non-adjacent regions.

Optionally, in any of the preceding embodiments, the method further comprises: for at least one UE, basing CSI measurements on uplink measurements.

Optionally, in any of the preceding embodiments, the method further comprises: assigning at least one port as a zero power port for use in making noise plus interference measurements.

Optionally, in any of the preceding embodiments, the method further comprises, for the at least one UE: determining a signal power from an uplink measurement; determining a CQI based on a ratio of the determined signal power to a noise plus interference measurement taken on a zero power port.

According to another aspect of the present invention, there is provided a method comprising: each TRP of a hypercell or part of a hypercell transmitting CSI-RS on at least one CSI-RS port assigned to the TRP. This provides CSI-port assignment to TRP granularity.

Optionally, in any of the preceding embodiments, the method further comprises: informing each UE of an initial set of CSI-RS ports from which the UE is to select a smaller number of high power ports to measure and report on.

Optionally, in any of the preceding embodiments, the method further comprises: informing each UE of which CSI-RS ports to measure.

Optionally, in any of the preceding embodiments, the method further comprises, within the hypercell or the part of the hypercell, spatially reusing at least some of the CSI-RS ports.

Optionally, in any of the preceding embodiments, the method further comprises: employing at least two differing reuse factors for each of at least two differing sets of CSI-RS ports.

Optionally, in any of the preceding embodiments, a first reuse factor is used for CSI-RS ports assigned to TRPs with relatively larger coverage area, and a second reuse factor is used for CSI-RS ports assigned to TRPs with relatively smaller coverage area.

Optionally, in any of the preceding embodiments, the method further comprises: defining a first subset of the CSI-RS ports of the hypercell of part of a hypercell for use with more mobile UEs, and a second subset of the CSI-RS ports of the hypercell of part of a hypercell for use with less mobile UEs;

Optionally, in any of the preceding embodiments, the method further comprises: informing each UE of which set of ports to measure.

According to another aspect of the present invention, there is provided a method comprising: assigning a set of CSI-RS ports to a UE; at least one TRP transmitting CSI-RS on the CSI-RS ports assigned to the UE. This method provides UE-specific CSI-RS port assignment.

Optionally, in any of the preceding embodiments, the method further comprises: updating membership of the set of TRPs as a function of mobility of the UE.

Optionally, in any of the preceding embodiments, at least one TRP transmitting comprises a set of TRPs transmitting.

Optionally, in any of the preceding embodiments, the method further comprises: applying a group-based or hypercell based approach to CSI-RS port assignment for another UE.

According to another aspect of the present invention, there is provide a method comprising: receiving SRS symbols from a UE and performing uplink channel measurements based on the received SRS symbols; allocating a downlink zero power port; receiving a measurement of interference and noise for the zero power port from the UE; determining a CQI based on the uplink channel measurements and the measurement of interference and noise. In this embodiment, CQI is based both on received interference and noise measurements, and uplink channel measurements based on SRS symbols.

According to another aspect of the present invention, there is provided a method comprising: assigning a respective SRS channel comprising a respective sequence, resource element pattern, and time frequency location to each of a plurality of UEs for SRS transmission; for each UE, associating the SRS channel with a UE location encoded into a UE identifier. This provides a method of associating SRS channels with UE location encoding.

According to another aspect of the present invention, there is provided a method comprising: assigning a respective SRS channel comprising a respective sequence, resource element pattern, and time frequency location to each of a plurality of UEs for SRS transmission; for each UE, associating the SRS channel with a VTRP identifier of a VTRP serving a UE. This provides a method of associating SRS channels with VTRP identifiers.

Optionally, in any of the preceding embodiments, the method further comprises assigning orthogonal sequences and/or orthogonal patterns to UEs that are located in the same vicinity, or for UEs that are associated with a same VTRP.

Optionally, in any of the preceding embodiments, the method further comprises: assigning patterns and sequences with low cross-correlations for UE groups in adjacent vicinities or adjacent VTRPs.

According to another aspect of the present invention, there is provided a method comprising: a TRP transmitting a demodulation reference symbol (DMRS) to a scheduled UE comprising a sequence transmitted in a pattern of resource elements within a location; wherein the DMRSs transmitted to different UEs are orthogonal or have low correlation and are assigned using a UE-based, location based, or VTRP based approach. This provides for orthogonal DMRS transmission.

Optionally, in any of the preceding embodiments, the method further comprises: informing the UE of DMRS ports used by co-paired UE for interference cancellation purposes.

Optionally, in any of the preceding embodiments, the method further comprises: puncturing data transmission to the UE in locations that interfere with DMRS location of a co-paired UE.

According to another aspect of the present invention, there is provided a method that combines any two or more of the network/TRP methods summarized above or described herein.

According to another aspect of the present invention, there is provided a method in a UE comprising: receiving a VTRP identifier of a VTRP serving the UE; determining a set of CSI-RS ports associated with the VTRP identifier; measuring and reporting on the determined set of the CSI-RS ports. This is based on CSI-RS port assignment based on VTRP identifier.

Optionally, in any of the preceding embodiments, determining the set of CSI-RS ports comprises deriving the set from the VTRP identifier.

According to another aspect of the present invention, there is provided a method in a UE comprising: receiving a UE identifier, the UE identifier including a field that encodes a location of the UE; determining a set of CSI-RS ports associated with the location; measuring and reporting on the determined set of the CSI-RS ports. This is based on CSI-RS port assignment based on location.

Optionally, in any of the preceding embodiments, determining the set of CSI-RS ports comprises deriving the set from the location.

Optionally, in any of the preceding embodiments, determining the set of CSI-RS ports from the location comprises determining a VTRP identifier from the location, and then determining the set of CSI-RS ports from the VTRP identifier.

According to another aspect of the present invention, there is provided a method in a UE comprising: a UE determining its own speed, and selecting a set of CSI-RS ports to measure and report on based on the determined speed. This is based on CSI-RS port selection based on speed.

According to another aspect of the present invention, there is provided a method in a UE comprising: the UE blindly detecting CSI-RS ports and measuring and reporting on a number of highest-power ports.

According to another aspect of the present invention, there is provided a method in a UE comprising: receiving signaling defining an initial set of CSI-RS ports; the UE detecting an initial set of CSI-RS ports, and measuring and reporting back on some number of highest power ports within the set. This provides for a reduced CSI-RS reporting in which highest power ports are measured and reported.

According to another aspect of the present invention, there is provided a method in a UE comprising: the UE determining an assigned SRS channel comprising a sequence, resource element pattern, and time frequency location based on a location encoded into a UE identifier; transmitting an SRS using the assigned SRS channel. In this embodiment SRS channel is determined based on an encoded location.

According to another aspect of the present invention, there is provided a method in a UE comprising: the UE determining an assigned SRS channel comprising a sequence, resource element pattern, and time frequency location based on a VTRP identifier of a VTRP serving the UE; transmitting an SRS using the assigned SRS channel. In this embodiment, the SRS channel is determined based on VTRP.

According to another aspect of the present invention, there is provided a method that combines any two or more of the UE methods claimed above.

According to another aspect of the present invention, there is provided a TRP or group of TRPs configured to implement the method summarized above or described herein.

According to another aspect of the present invention, there is provided UE configured to implement the method summarized above or described herein.

BRIEF DESCRIPTION OF THE DRAWINGS

Embodiments of the disclosure will now be described with reference to the attached drawings in which.

DETAILED DESCRIPTION

Figure 1:
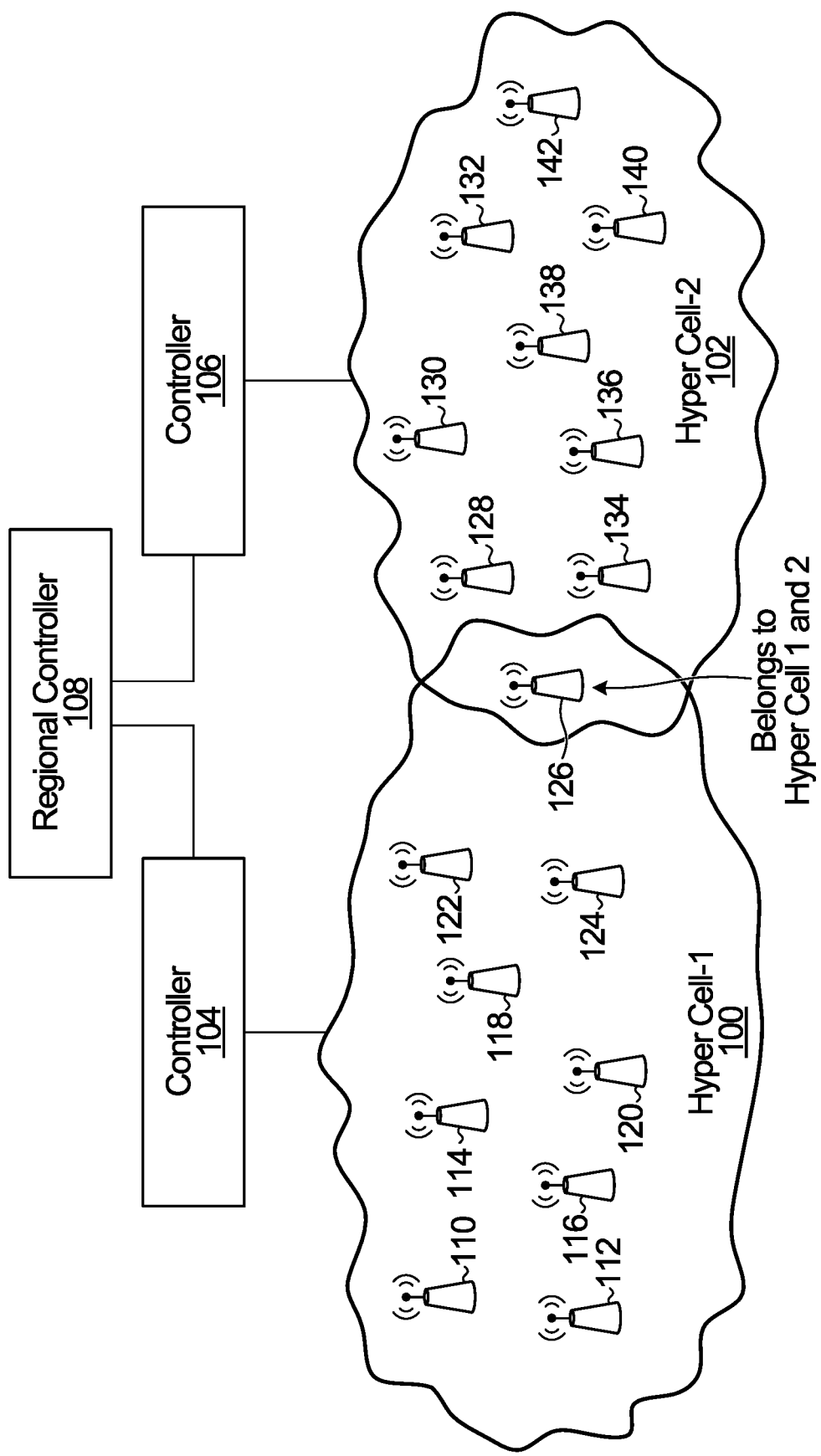
FIG. 1 is a schematic view of a system with two hyper cells each including multiple TRPs.

Generally, embodiments of the present disclosure provide a method and system for configurable sequence usage for transmission reception points. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

An example of a hypercell-based network is depicted in FIG. 1. Shown is a network with two hypercells 100,102. Each hypercell 100,102, for example, has a respective controller 104,106 connected to a regional controller 108. Each hypercell is a virtual entity that covers a group of physical TRPs sharing the same hypercell ID. A hypercell, which also may be referred to as "New Radio (NR) Cell", may have a configurable coverage area according to network topology, UE distribution and load distribution. The boundary of the hypercell may be flexible and the system may dynamically add or remove TRPs to form the hypercell.

In some implementations, a hypercell may overlap with a neighboring hypercell. In the illustrated example, hypercell 100 has TRPs 110, 112, . . . 126. Hypercell 102 also has a group of TRPs 126,128, . . . , 142, including TRP 126 that also belongs to hypercell 100. In some implementations, the TRP 126 may be assigned to hypercell 100 and hypercell 102 at different times, frequencies or spatial directions and the system may switch the hypercell ID for the TRP 126 between hypercell 100 and hypercell 102. The TRPs of a hypercell may include TRPs having different coverage area sizes; for example, a given hypercell may include macro cells and/or pico cells.

It should be understood that the network of FIG. 1 is a specific example for illustration purposes. This network will be used as a basis for example implementations of the various embodiments described below, but they are not limited to such application.

As noted above, a CSI-RS can be transmitted by multiple TRPs within a hypercell. Each TRP may have multiple (N) transmit antennas, and the UE has M receive antennas, resulting in an M×N channel.

Transmissions may employ a time-frequency resource having a plurality of orthogonal frequency division multiplexing (OFDM) subcarriers in the frequency dimension, and OFDM symbol durations in the time domain. One subcarrier for one OFDM symbol duration is a resource element (RE) and is the smallest resource granularity. A pilot signal transmitted by a given TRP is made up of a pilot pattern, which defines locations (a set of REs) within the time-frequency resource; and a pilot sequence, which is a sequence of values sent in the locations defined by the pilot pattern.

In a wireless access network, some pilot (also known as reference signal) ports are defined such that the UEs can measure the channel state information and report it back to the network. A CSI-RS port is a pilot port defined as a set of known symbols from a sequence transmitted over known resource elements (for example OFDM resource elements) for UEs to measure the channel state. For example, this might include a specific pilot sequence in a specific pilot pattern. Each TRP transmits CSI-RS symbols assigned by the network. A UE assigned to measure a particular CSI-RS port can measure the transmitted pilot sequence, measure the associated channel state and report it back to the network. CSI-RS port design involves determining how to assign different measurement ports to TRPs within a hypercell.

Group-Based

In some embodiments, a group-based approach is used to allocate a determined number of CSI-RS ports to a group of UEs.

In some embodiments, the CSI-RS allocation is virtual TRP point (VTRP)-based. A VTRP consists of a group of TRPs that collectively serve a group of UEs.

In other embodiments, the CSI-RS allocation is location-based.

With the group-based design, a set of CSI-RS ports is allocated to a group of UEs. The group of UEs that share the same set of CSI-RS ports are grouped together based on one or more factors, e.g., sharing a VTRP set and/or being in the same vicinity.

As detailed below, the group-based allocation can be VTRP-based or location-based. The assigned set of CSI-RS ports can be statically or semi-statically assigned in both VTRP-based and location-based scenarios.

When semi-statically assigned, a subset of the set of CSI-RS ports can be released from the corresponding VTRP or location. This can happen when, for instance, the location or the virtual cell corresponding to the set of CSI-RS ports does not require all the assigned CSI-RS ports due to a reduced number of active UEs. In some embodiments, the CSI-RS ports assigned to a VTRP may be totally released if all the UEs served by that VTRP leave the VTRP or are assigned to other VTRPs.

Group-Based Design: VTRP-Based

With the VTRP-based approach, a set of CSI-RS ports is associated with each VTRP identifier. In some embodiments, the set of CSI-RS ports is derivable from a VTRP identifier. The VTRP identifier is signaled to a UE by the network. As such, a UE, with knowledge of a VTRP identifier, can derive the associated set of CSI-RS ports. Alternatively, the CSI-RS ports may simply be maintained in a table for lookup. The VTRP is at least locally unique. That is to say, within a hypercell, the same VTRP identifier may be reused for two VTRPs that are non-adjacent. Where there is spatial reuse of the VTRP identifiers, there is corresponding spatial reuse of the CSI-RS ports.

Each UE, having determined a set of CSI-RS ports associated with the VTRP identifier, measures and reports those CSI-RS ports.

One advantage of VTRP-based design is that instead of sending the whole set of CSI-RS ports numbers that the UE needs to measure, the network sends the UE the corresponding VTRP identifier, and the UE can determine the CSI-RS ports it should measure.

Through appropriate CSI-RS port design, there is very little interference between the ports of two VTRPs. For instance, a UE that is supposed to measure ports 0, 1, 3 of VTRP 1 may also receive CSI-RS ports 0, 1, and 3 of VTRP 2. However, if VTRP 1 and VTRP 2 are not adjacent, the CSI-RS ports associated with VTRP 2 will not cause interference or alternatively the CSI-RS ports can be designed such that they will inflict manageably low interference on the desired CSI-RS ports corresponding to VTRP 1.

Figure 2:
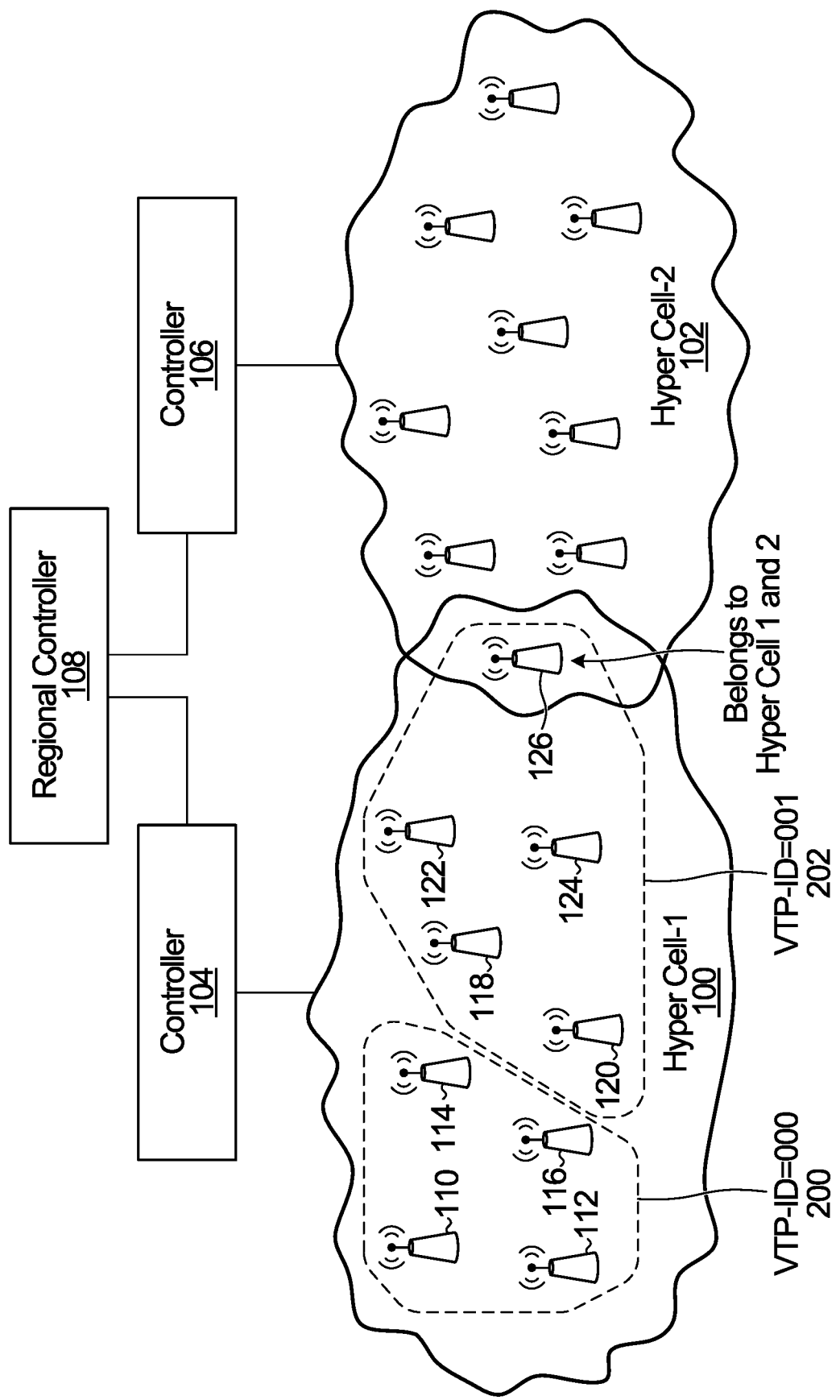
FIG. 2 shows the system of FIG. 1 with the TRPs of one hyper cell organized into two virtual TRPs.

Referring now to FIG. 2, shown is an example of the VTRP-based approach. The TRPs hypercell 100 of FIG. 1 have now been logically divided into two VTRPs 200,202. VTRP 200 has TRPs 110,112,114,116 and has VTRP identifier (VTRP-ID) 000. VTRP 202 has TRPs 118,120,122, 124,126 and has VTRP-ID 001. All the TRPs of a given VTRP will transmit a common set of CSI-RS ports associated with the VTRP-ID. A UE assigned that VTRP-ID will know which CSI-RS ports to measure and report on.

Group-Based Design: Location Based

In the location based approach, the location of the UE is encoded into the UE identifier, for example in a location field. More generally, the UE identifier is encoded with information that the UE can extract to determine which CSI-RS ports to measure, for example through derivation or look-up. Alternatively, the UE can deduce a VTRP from the location information, and then determine the CSI-RS ports from the VTRP as in the VTRP-based approach.

In some embodiments, the network informs the UE of its UE identifier. There are various ways the network can determine the location of the UE. The network can then determine a UE identifier for the UE that encodes the determined location. The network can change the set of CSI-RS ports the UE will measure by changing the UE's UE identifier.

The location based approach may be particularly suitable for low speed or nomadic UEs, whose location does not change frequently. These users can benefit from downlink (DL) closed loop communication, which requires more accurate CSI. This approach may be less suitable for high speed UEs because their locations change frequently, and location based port assignment may entail too much signaling.

Figure 3:
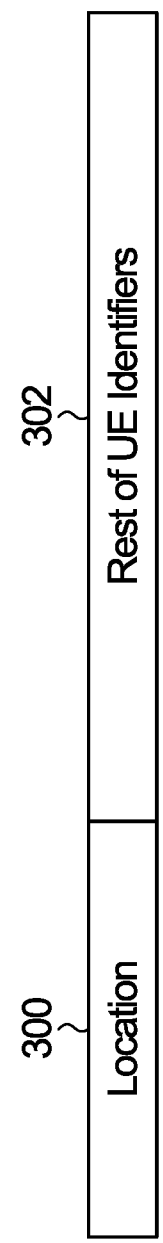
FIG. 3 is an example of a UE identifier structure provided by an embodiment of the invention.

An example of a UE identifier structure is depicted in FIG. 3. The UE identifier has a first field 300 containing the location information, and a second field 302 containing the remainder of the UE identifier. The first field 300 will have the same value for a set of UEs that are close together and are expected to measure the same CSI-RS ports. The first field may, for example, be a few bits wide, for example 3 bits resulting in the location of the UE granularity of up to 8 regions within a hypercell. Similarly to the VTRP based approach, the location field can be reused for non-adjacent regions in the hypercell. The second field 302 will be at least locally unique as between the group of UEs sharing the same first field.

Referring again to FIG. 2, for the location-based approach, rather than informing a UE of a VTRP-ID to measure, each UE is assigned a UE identifier with a location field that maps to a VTRP identifier and in turn to CSI-RS ports. UEs in the coverage area of VTRP 200 will be assigned a UE identifier with a different location field than UEs in the coverage area of VTRP 202.

In some embodiments, because the network may not be able to perform closed loop DL transmission for high speed UEs, a different approach is taken for high speed UEs based on channel quality indicator (CQI) measurements. High speed UEs may be indicated by using a special location field in the UE identifier field. In some embodiments, the location field in the identifier of a high speed UE is not used to derive the CSI-RS ports. The CSI-RS ports assigned to the special value of the location field may have a lower pilot density.

It may not be practical to assign dedicated CSI-RS ports to high speed UEs that are assigned to picocells. In such cases, CSI measurement can be based on uplink measurements, for example, based on SRS. This may include both the channel state associated with the serving picocells and the channel state's associated interference caused by nearby picocells.

In some embodiments, one or more ports are assigned as zero power ports. These may, for example, be hypercell wide common zero power (ZP-CSI-RS) ports. A signal power may be obtained from uplink (UL) measurement (e.g., SRS), and a noise plus interference measurement can be obtained using the ZP-CSI-RS ports. A CQI can be obtained from a ratio of the signal power to the noise plus interference measurement.

Hypercell Based

In some embodiments, a hypercell based approach to CSI-RS port allocation is employed. Within a hypercell, CSI-RS ports are reused, in a manner that takes into account interference due to such reuse, and ideally so as to minimize such interference, for example by ensuring a sufficient spatial separation between locations where the same CSI-RS port is used. For example, the CSI-RS ports may be engineered so that no UE in the hypercell receives the same CSI-RS duplicate with high power from a non-intended TRP in the hypercell.

In some embodiments, different reuse factors are employed for differing sets of CSI-RS ports. For example, some CSI-RS ports may be assigned to macro cells having a wider coverage area, and as such may be re-used less or may not be re-used at all. CSI-RS ports with wider coverage area and/or less re-use will be more suitable for more mobile UEs. In some embodiments, a first set of CSI-RS ports is used for fewer mobile UEs, and a second set of CSI-RS ports is used for more mobile UEs. The network may inform the UE of which set of ports to measure. Alternatively, the UE determines its own speed, and selects the set of ports based on that speed.

The region wherein this approach of CSI-RS port design is used may cover all of a hypercell or only a part of hypercell.

In some embodiments, the CSI-RS measurement set is UE determined. For example, the UE may measure some number of highest-power ports and report all or a subset of those back to the network. With this approach, the UE blindly detects the received most powerful CSI-RSs.

In some embodiments, the CSI-RS measurement set is network determined. The network instructs a UE to measure and report specific ports.

In some embodiments, the network determines an initial set of CSI-RS ports, and instructs these to the UE. Then the UE measures some number of highest-power ports within that set, and reports all or a subset of those back to the network.

Figure 4:
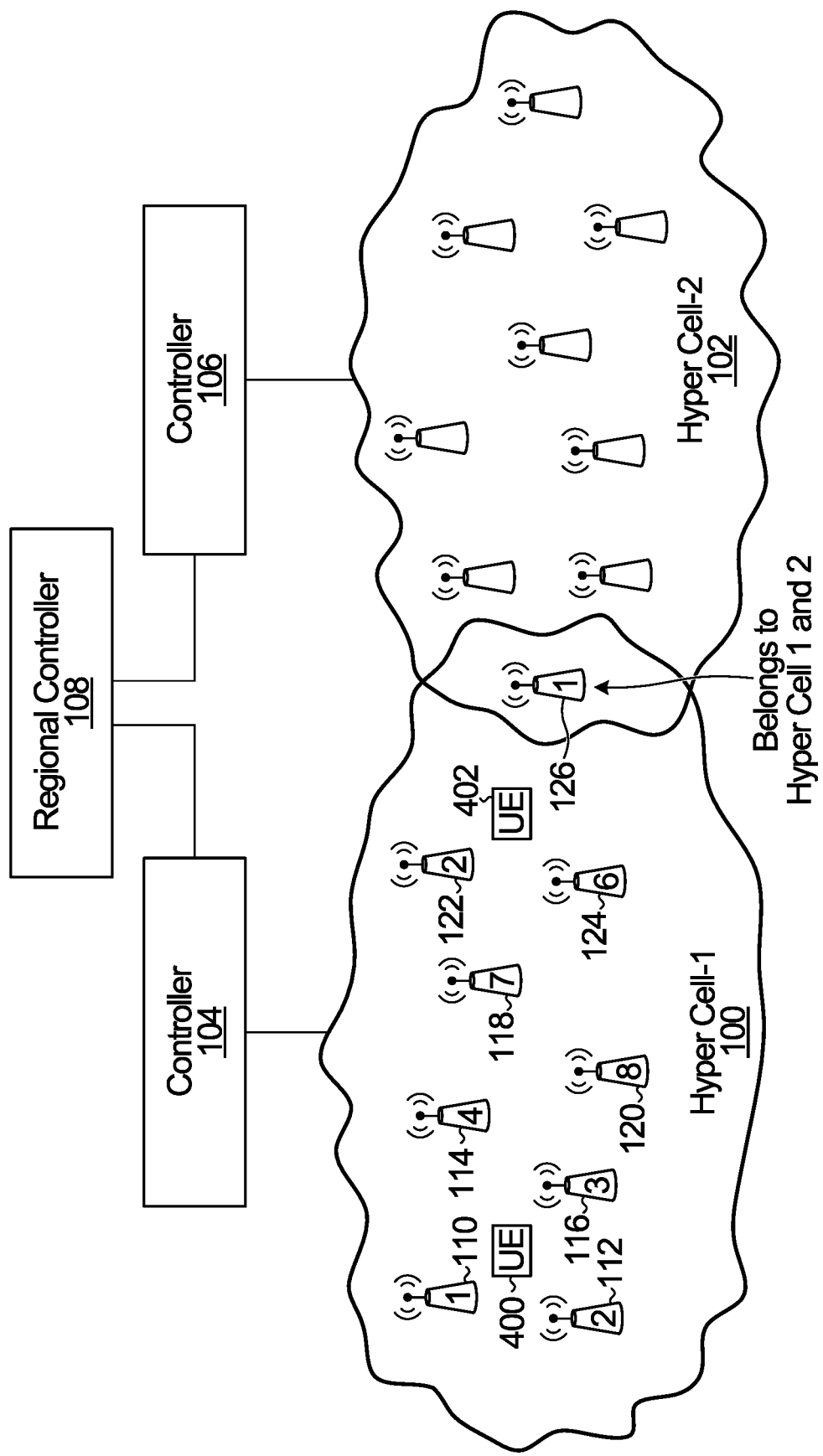
FIG. 4 is a schematic view of the system of FIG. 1, where CSI-RS ports are spatially re-used.

An example will be described with reference to FIG. 4. In FIG. 4, each TRP of hypercell 100 is labeled with a CSI-RS port number between 1 and 8. For example, TRP 110 is labeled "1" meaning it is assigned CSI-RS port number 1. The CSI-RS ports can be spatially re-used, as illustrated with CSI-RS port 1 being assigned to both TRP 110 and TRP 126. A UE 400 that measures and reports back the most powerful ports might measure and report for CSI-RS ports 1, 2, 3 and 4. Another UE 402 might measure and report on CSI-RS ports 1, 2 and 6.

In another specific example, a set of N=16 ports is defined for the entire hypercell, and assigned throughout the hypercell with spatial re-use. The UE knows the 16 ports, and measures and reports back on the best K=4 ports. N and K are implementation specific. All UEs measure the same 16 ports. The network is typically aware of the UE locations. In addition, the network may further infer the corresponding port that a UE is reporting if the port is reused based on its location or in other ways. For example, if a UE reports CSI for port 1, which is assigned to different TRPs in the hypercell, the network can identify the TRP based on proximity to the known location of the UE.

The CSI-RS port design may be tailored for the majority of UEs requiring more detailed and accurate CSI, which are typically low-speed UEs.

As noted previously, it can be difficult to perform closed loop transmission for high-speed UEs. In some embodiments, a set of dedicated specific CSI-RS ports are assigned for high-speed UEs. These CSI-RS ports can have less density, be sent from a macro cell, or both. In some embodiments, these may include only interference measurement ports.

Dynamic UE-Centric

In some embodiments, a dynamic UE-centric approach to CSI-RS port allocation is employed. This may be mainly applicable to mobile UEs in an environment where the number of TRPs is comparable to or larger than the number of mobile UEs.

With this approach, a set of CSI-RS ports is assigned to the mobile UE. As the UE moves, the assigned set of CSI-RS ports moves with it. As such, the TRPs which send the UE-specific CSI-RS set will also be changing to follow the moving UE.

Figure 5A:
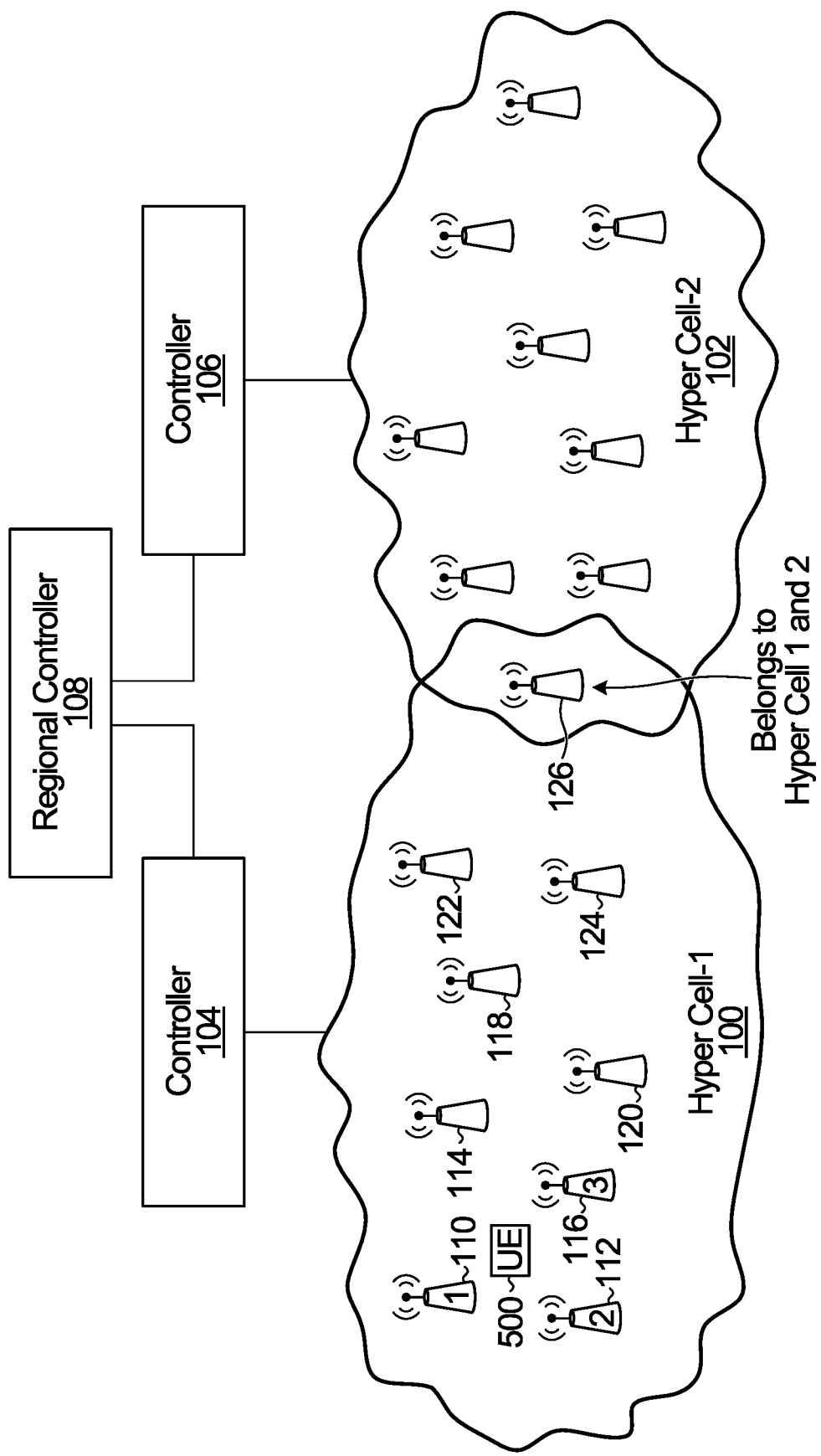
FIGS. 5A and 5B are schematic views of the system of FIG. 1, showing how CSI-port assignment changes as a function of mobility of a UE.
Figure 5B:
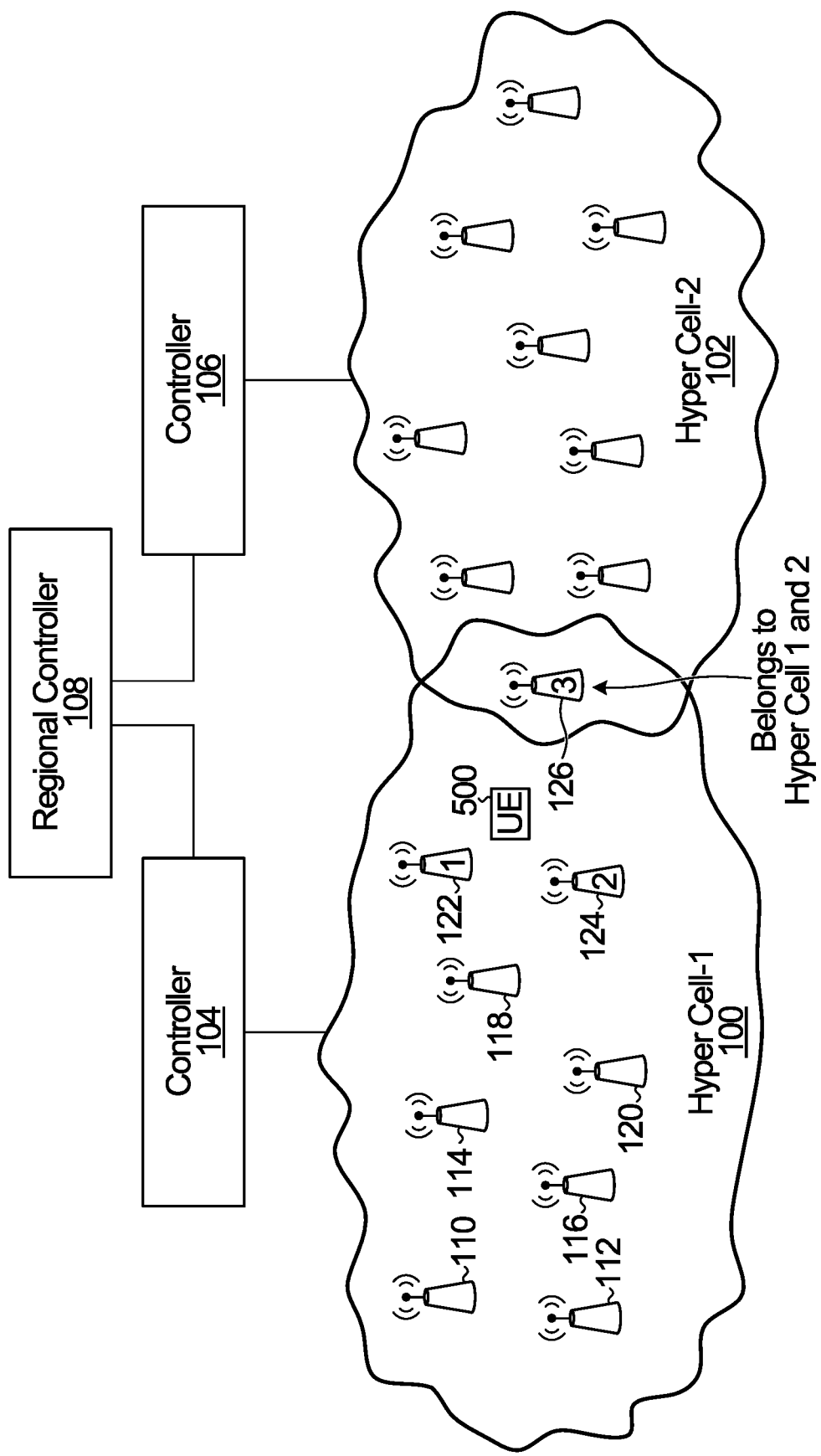

An example is depicted in FIGS. 5A and 5B. In this example, the UE 500 is assigned CSI-RS ports 1, 2 and 3. At time 1, depicted in FIG. 5A, TRPs 110, 112, 116 transmit pilot signals on CSI-RS ports 1, 2, and 3. At a later time, the UE has moved to a new location depicted in FIG. 5B, TRPs 122,124,126 transmit pilots on CSI-RS ports 1, 2 and 3.

This approach may be particularly suitable when a group of UEs move together, for example on a bus, highway or train. This approach may be combined with the group-based and/or hypercell based design, with more static/nomadic UEs configured to use the group-based or hypercell based design.

SRS Based Measurements

In some embodiments, time division duplex (TDD) transmission is employed in an ultra-dense network (UDN), and CQI and also CSI can be estimated if channel reciprocity holds. Intra-hyper-cell interference measurement provides accurate interference measurement for most UEs in a UDN hypercell network because, in this case, most of the interference is produced by the TRPs in the hypercell.

In some embodiments, TDD transmission is employed in a normal density network. In this case, CQI can be measured by the network based on transmitted SRS symbols. The interference and noise may be measured at the UE and fed back to the network. This is due to the fact that UE's interference comes mainly from outside of the hypercell. Interference plus noise may be measured using the ZP-CSI-RS described previously. CSI may also be estimated if channel reciprocity holds.

In some embodiments, frequency division duplex (FDD) transmission is employed in an UDN. The channel estimation possibilities using SRS for FDD in a UDN are similar to those for TDD in a UDN scenario, but it may only be possible to estimate the long term statistical variations. For example, path losses and also covariance matrices of the signal and interference channels may be measured.

In some embodiments, FDD transmission is employed in a normal density network. In this case, it may only be possible to measure path losses and also a covariance matrix of the signal channel. A long-term CQI calculation can be based on the previously described ZP CSI-RS.

CSI-RS transmission configuration is performed by network and can be periodic, semi-persistent, or single-shot. Semi-persistent and single-shot CSI-RS transmissions can be event-driven. Semi-persistent CSI-RS transmission can be periodic during its transmission. Periodicity during this transmission period can be explicitly configured by the network or implicitly determined by event of DCI.

In some embodiments, CSI-RS resource allocation can be UE-specific. More than one UE can share a UE-Specific CSI-RS resource. This is configured by network. UE-specific and group-UE specific CSI-RS configuration may be sent to UEs through RRC signalling. In some embodiments, cell specific CSI-RS configuration may be broadcast in synchronization sequence (SS) block or physical broadcast channel (PBCH).

In some embodiments, a UE can be assigned multiple UE-specific CSI-RS resources. Some of these CSI-RS resources, in some implementations, may be shared with other UEs. Assigned CSI-RS resources to each UE may have different configuration regarding periodicity, density in time and frequency or the used sequences.

Figure 6:
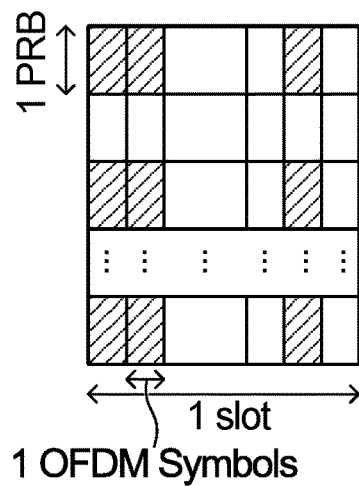
FIG. 6 is an example of a CSI-RS resource.

In some embodiments, each CSI-RS resource is comprised of N OFDM symbols within one slot in the time domain and K physical resource blocks (PRBs) in the frequency domain. The N symbols in the time domain may be non-adjacent. Moreover, the K PRBs in the frequency domain may be non-adjacent. An embodiment is depicted in FIG. 6 which shows a time frequency resource with PRBs within a bandwidth in the vertical axis and OFDM symbols making up a slot on the horizontal axis. In this embodiment, the CSI-RS resource is composed of the set of resources that are shown with hatching, these including N=three non-adjacent OFDM symbols in the time domain (although two of the three are adjacent), and K=3 non-adjacent PRBs in the frequency domain.

In some embodiments, the N by K CSI-RS resource may be comprised of repeated versions of a smaller CSI-RS resource component that covers n adjacent OFDM symbols in the time domain, 1≤n≤N and k adjacent PRBs in frequency domain where 1≤k≤K. $n_1$ out of n OFDM symbols are actually used for transmitting CSI-RS sequence. These $n_1$ symbols may or may not be adjacent. Similarly $k_1$ out of k PRBs in frequency domain are actually used for transmitting CSI-RS resources. These $k_1$ may or may not be adjacent. The repeated versions of the CSI-RS resource component may contain the same or different content.

Figure 7:
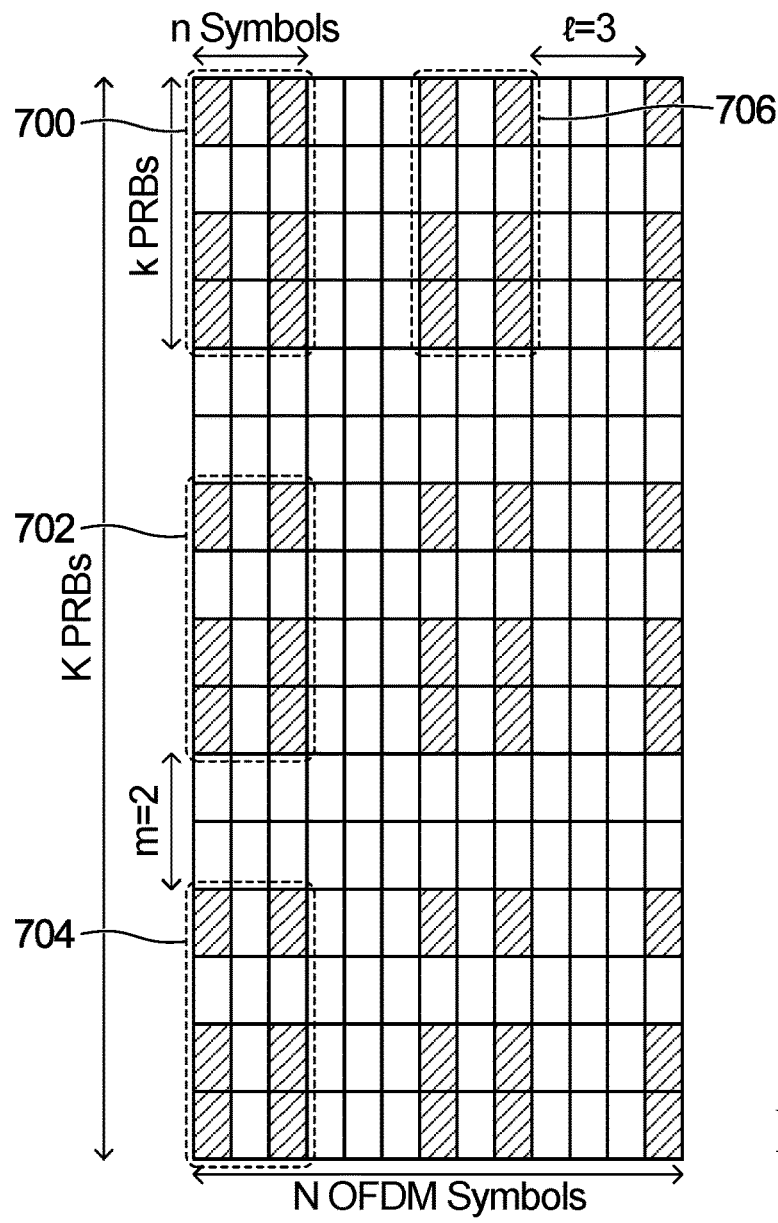
FIG. 7 is an example of a CSI-RS resource component.

An embodiment is shown in FIG. 7 where there are multiple repetitions (only four labelled 700,702,704,706) of a CSI-RS resource component that is 3 OFDM symbols by 4 PRBs, and within the CSI resource component, the first and third symbols ($n_1$=2) are used, and the first, third and fourth PRBs ($k_1$=3) are used.

In some embodiments, gaps are defined between pairs or consecutive CSI-RS resource components, in time and/or frequency. An embodiment is shown in FIG. 7, where a gap of m=2 PRBs is defined between consecutive CSI-RS resource components in the frequency dimension, and a gap of l=3 is defined between consecutive CSI-RS resource components in the time dimension. The values of m and/or l may be network configurable.

In some embodiments, a transmission comb "m" may be used to configure a CSI-RS resource using CSI-RS resource components in the frequency domain. The value of the transmission comb "m" is network configurable. The value "m" indicates the number of skipped adjacent PRBs in between two consecutive CSI-RS resource component repetitions in frequency dimension. The transmission comb "m" can represent either the unit of an integer number of skipped PRBs (i,e, m=4 means skipping 4 PRBs) or in the unit of the size of CSI-RS resource component (i.e., m=4 means skipping 4 times the frequency dimension of the CSI-RS resource component). The unit of transmission comb may be network configurable, for example as between the two options detailed above, namely skipped PRBs or skipped units of the size of CSI-RS resource component. Referring again to FIG. 7, in the embodiment illustrated, this shows an embodiment of a transmission comb with m=2.

Figure 8:
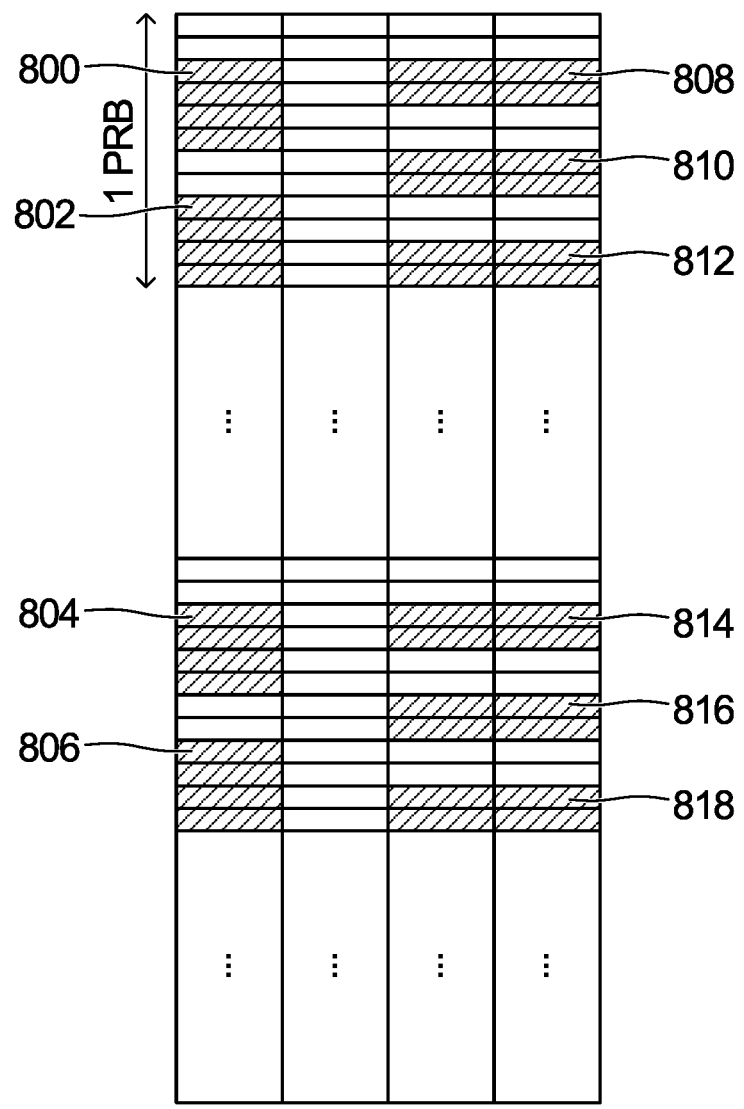
FIG. 8 is an example of CSI-RS resource component units.

In some embodiments, a CSI-RS resource component is comprised of "s" different types of CSI-RS resource component units. Each CSI-RS resource component unit is comprised of "u" consecutive resource elements (REs) in the frequency dimension and "v" consecutive OFDM symbols in the time dimension. The values of the "v", "u", and "s" are network configurable. How "s" CSI-RS resource component units are distributed in time and frequency to collectively constitute the CSI-RS resource component may also be network configurable. An embodiment is shown in FIG. 8 where s=2 different types of CSI-RS resource component units are defined. One type of unit is u=4 REs in the frequency dimension by v=1 OFDM symbol in the time dimension. The CSI-RS resource component has four units 800,802,804,806 having this type shown in FIG. 8, but there may be additional such units, not shown. Another type of unit is u=2 REs in the frequency domain by v=2 OFDM symbols in the time domain. The CSI-RS resource component has six units 808,810,812,814,816,818 having this type shown in FIG. 8, but there may be additional such units, not shown. Thus, in total 10 component units are combined to form a CSI-RS resource component within a time frequency area that is n=4 OFDM symbols and k=4 PRBs.

In some embodiments, a CSI-RS sequence is mapped on CSI-RS resource component units. A CSI-RS sequence may be fully mapped on CSI-RS resource component units of one CSI-RS resource component or the total of CSI-RS resource component units of multiple repetitions of a CSI-RS resource component. A sequence mapping procedure (for example in terms of first time and then frequency or vice versa) may be network configurable.

The mapping of two different CSI-RS sequences on a time/frequency plane (for example mapping onto CSI-RS resource component units) can be non-overlapping, partially overlapping, or fully overlapping.

In some embodiments, each CSI-RS sequence can be generated using a sequence seed. The sequence seed may be network configurable and may depend on Cell-ID, for example hypercell ID or NR cell ID, and/or UE-specific parameters such as a UE dedicated connection ID.

CSI-RS sequence may be further scrambled using a cell specific sequence. The scrambling cell specific sequence may be generated using a seed that depends on the cell identifier.

In some embodiments, the sequence may be further scrambled using a UE specific sequence. The scrambling UE specific sequence may be generated using a seed that depends on a UE specific identifier such as a UE dedicated connection ID.

CSI-RS sequences that are mapped to overlapping CSI-RS resource components units may correspond to one or multiple UEs. In either case, sequence seeds should be used so that overlapping CSI-RS sequences are orthogonal or have low cross-correlations on the overlapping CSI-RS resource component units.

In some embodiments, REs used for CSI-RS resource component units are dedicated to CSI-RS transmission and no data or control signal will be sent on these REs.

Alternatively, a part of the time frequency plain that is covered by N by K CSI-RS resource may be dedicated to CSI-RS transmission only.

In another alternative, only those OFDM symbols in the time domain and PRBs in the frequency domain that include a part of a CSI-RS resource component are dedicated to CSI-RS transmission only. The other PRBs and OFDM symbols on the time frequency plain that are covered by N by K CSI-RS resource can be used for transmission of data or control signalling.

In some embodiments, one or a combination of wideband, partial band, and narrowband CSI-RS resource allocation are supported. A UE can be assigned multiple CSI-RS resources with different configurations at different parts of the frequency band. Some of the assigned multiple CSI-RS resources may be shared by other UEs in a cell.

SRS Design

An SRS is a sequence transmitted by a UE in a pattern of REs within a time frequency location. For example, a ten-element sequence might be transmitted using 10 REs. These can be associated with a pattern that defines the 10 REs within a resource space of 10 OFDM symbols by 100 subcarriers. The location specifies which 10×100 resource space to use.

For some UEs, for example low-speed UEs, the sequence, the mapping of the sequence onto the resource space for each UE's SRS may be based on the UE location (for example as encoded into the UE identifier as described previously), or a VTRP that the UE is assigned to. The UE processes its UE ID and/or VTRP ID to deduce the SRS sequence, pattern and location.

In some embodiments, orthogonal sequences and/or orthogonal pilot locations may be used for the UEs that are located in the same vicinity, or for UEs that are associated with the same VTRP.

In some embodiments, patterns and sequences with low cross-correlations are used for UE groups in adjacent vicinities (or adjacent VTRPs).

The sequence/patterns can be re-used for far apart vicinities or VTRPs.

High speed UEs may be assigned specific pattern/sequences that have low correlation among themselves, with other high speed UEs that have potentially interfering paths, and with the SRS of adjacent low speed UEs.

For these high-speed UEs, the network may reuse tracking sequences because path loss measurement may be sufficient to ensure an acceptable level of performance.

DMRS Design

A demodulation reference symbol (DMRS) is a sequence transmitted by a TRP in a pattern of REs within a location. For example, a ten-element sequence might be transmitted using 10 REs. These can be associated with a pattern that defines the 10 REs within a resource space of 10 OFDM symbols by 100 subcarriers. The location specifies which 10×100 resource space to use.

DMRS is only needed for a scheduled UE in its scheduled time/frequency resource area. An important factor that can affect the performance of DMRS detection and the subsequent data decoding is the presence of a co-paired UE (and whether the UE is aware of its existence and its attributes such as the assigned DMRS pattern).

A co-paired UE is a UE that is scheduled in the same hypercell in the same time-frequency resources as the considered UE. The DMRS/data of a co-paired UE can cause significant interference for the considered UE. This interference may if occur the serving VTRP of the co-paired UE is close by, overlapping or the same as the VTRP serving the considered UE.

In some embodiments, a DMRS design is provided that takes into account the presence of co-paired UEs to improve the detection performance. Different DMRS designs are applicable to the scenarios with no co-paired UEs, and with co-paired UEs.

When there is no co-paired UE, there is complete freedom in sequence and location design. This can be applied to both high and low speed UEs. The sequence and location of DMRS may be entirely determined based on UE-ID, the serving VTRP identifier, its location, and/or the location of the allocated time frequency resources for scheduled data.

When there is a co-paired UE present, in some embodiments, the design for the two UEs is made as if there is no co-paired UE, i.e. by ignoring the presence of the co-paired UE. This makes for a relatively simple design, in that DMRS design is independent of other scheduled UEs. In some embodiments, the network informs a given UE of the DMRS pattern of the co-paired UE for some level of cancellation.

In some embodiments, DMRSs that are orthogonal or have low correlation are designed, and assigned using a UE based, location based, or VTRP based approach.

With the UE based approach, each UE knows its DMRS ports using its own UE ID. The network can let the UE know about the DMRS of the co-paired UE for interference cancellation purposes.

With the location based approach, a group of UEs in the same location know the set of ports that they may be assigned to. The network notifies each UE in the group about the specific DMRS port that it is assigned to. For interference cancellation purposes, the network may notify each UE about the port(s) that its neighboring scheduled UEs are assigned to.

An embodiment of location based approach: Each UE knows its location and from it, the UE can calculate/deduce/look up all the potential patterns that can be used in its neighborhood. The network tells the UE its pattern number. The network may additionally tell the UE the pattern indices from the set of known patterns at the UE that are used for neighboring co-paired UEs.

The VTRP based approach can be similar to that described previously for CSI-RS.

In some embodiments, to cancel the interference to co-paired UEs due to DMRS, data of the co-paired UE is punctured at the time-frequency resources corresponding to the DMRS of the considered UE, and vice versa, to reduce the amount of interference when decoding the DMRS. In some embodiments, both UEs will have punctured data as described above, in some embodiments only one or the other UE may puncture its data. This is for example the case, when data intended to one UE (UE1) induces more interference to the other (UE2). In that case, only the data of UE1 needs puncturing.

Figure 9A:
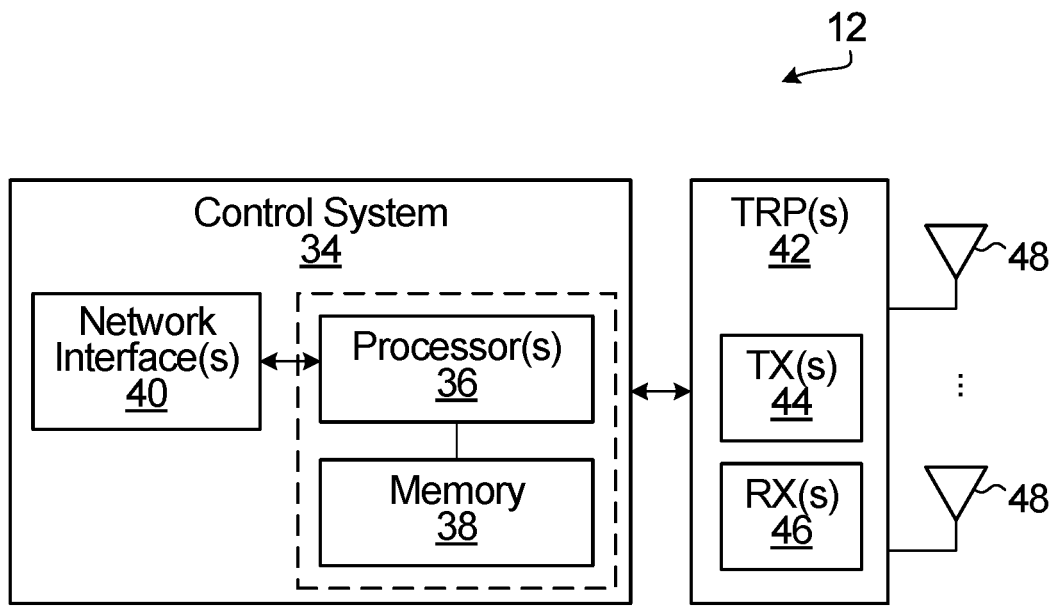
FIG. 9A is a block diagram of a hyper cell.

FIG. 9A is a schematic block diagram of a hyper cell 12 configured to perform one or more of the methods described herein. The hyper cell includes a control system 34 and one or more TRPs 42. In some implementations, the control system 34 is in the form of circuitry configured to perform the access node functions. In yet other implementations, the control system or circuitry 34 includes one or more processors 36 (e.g., CPUs, ASICs, FPGAs, and/or the like) and memory 38 and possibly a network interface 40. Each TRP 42 includes one or more transmitters 44 and one or more receivers 46 coupled to one or more antennas 48. In some other implementations, the functionality of the control system 34 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the hyper cell 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 9B:
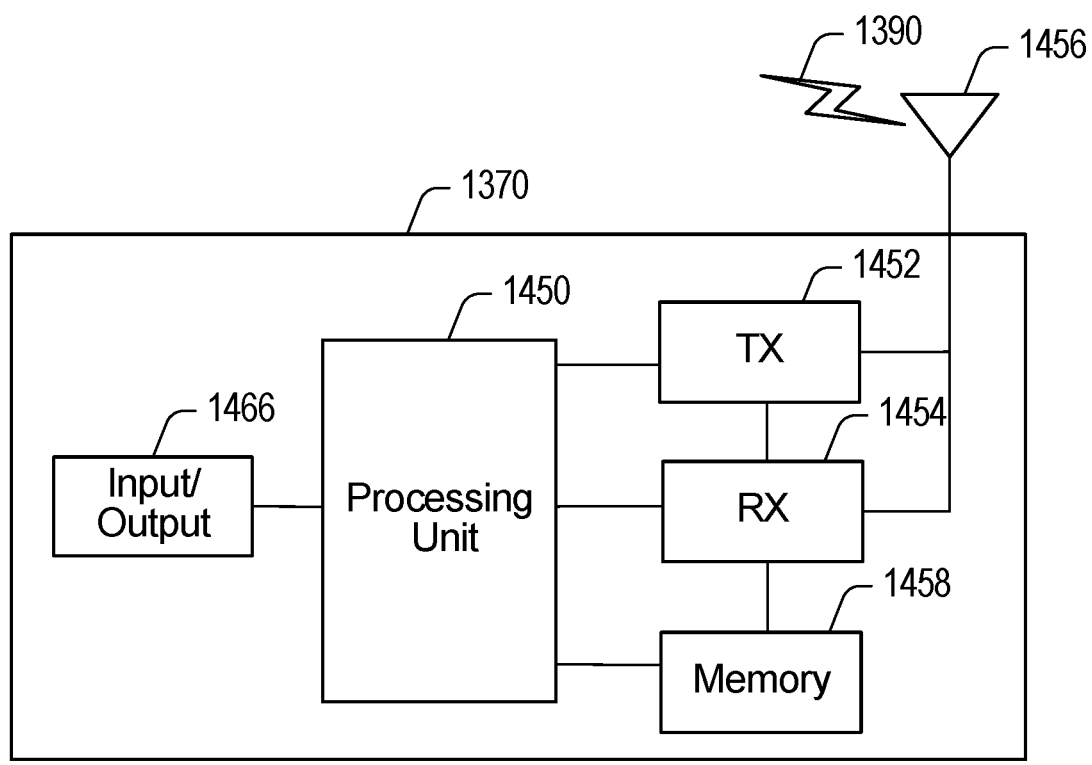
FIG. 9B is a block diagram of a TRP.

FIG. 9B illustrates an example TRP 1370. As shown in FIG. 9B, the TRP 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler (not shown) may be coupled to the processing unit 1450. The scheduler may be included within or operated separately from the TRP 1370. The processing unit 1450 implements various processing operations of the TRP 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals 1390. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described elsewhere herein. The memory 1458 stores instructions and data used, generated, or collected by the TRP 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

Figure 10:
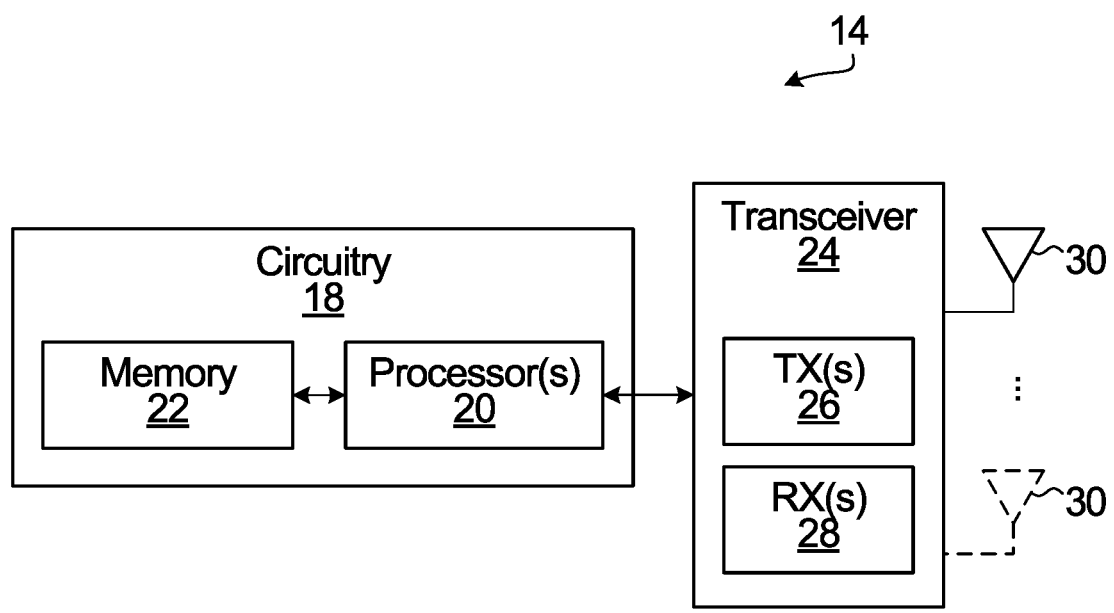
FIG. 10 is a block diagram of a wireless device.

FIG. 10 is a schematic block diagram of a wireless device 14 according to some embodiments of the present disclosure. As illustrated, the wireless device 14 includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In some embodiments, the wireless device includes a synchronization sequence detector 80 that performs synchronization sequence detection as described herein. There is a characteristic determiner 82 that makes a determination of a characteristic of a source of a detected synchronization sequence based on the detected sequence, for example high power or low power In some embodiments, there is a power controller 84 that adjusts transmit power based on the determined characteristic.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

FIGS. 11 to 26 are flowcharts of methods for execution in a network or a UE. Note that any of the network methods can be combined, and any of the modifications/alternatives described above can be applied to these methods. Similarly, any of the UE methods can be combined, any of the modifications/alternatives described above can be applied to these methods.

Figure 11:
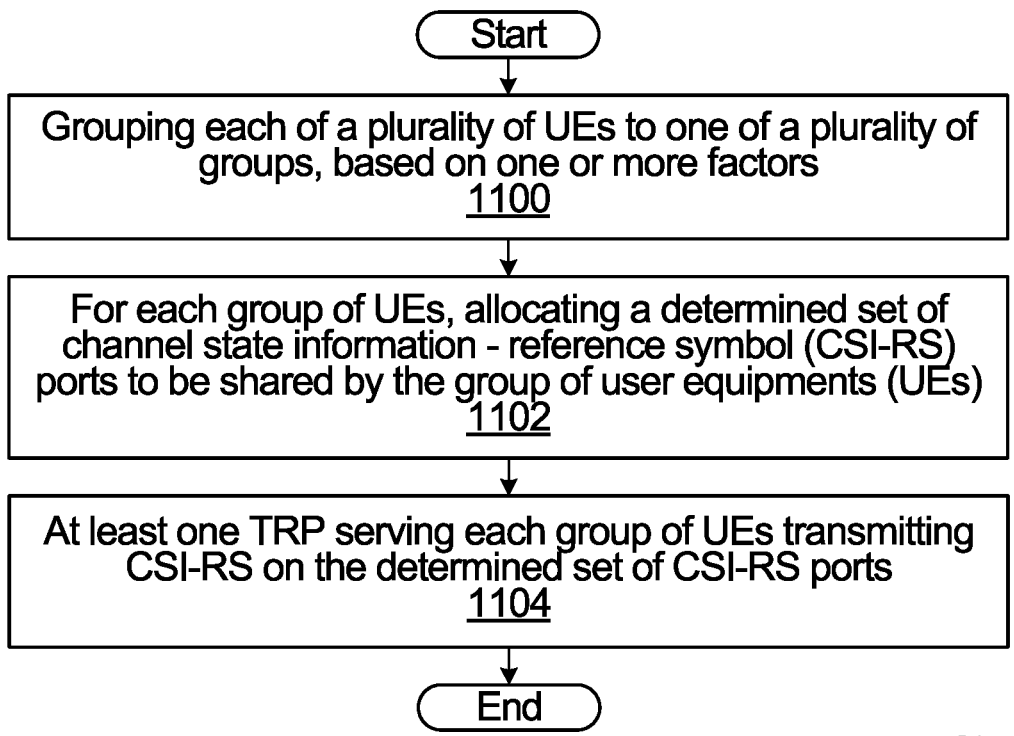
FIGS. 11 to 26 are flowcharts of methods for execution by a network or a UE.

FIG. 11 is a flowchart of a method for execution by a network provided by an embodiment of the invention. The method begins a 1100 with grouping each of a plurality of UEs to one of a plurality of groups, based on one or more factors. The method continues at 1102 with, for each group of UEs, allocating a determined set of channel state information—reference symbol (CSI-RS) ports to be shared by the group of user equipments (UEs). The method continues at 1104 with at least one TRP serving each group of UEs transmitting CSI-RS on the determined set of CSI-RS ports.

Figure 12:
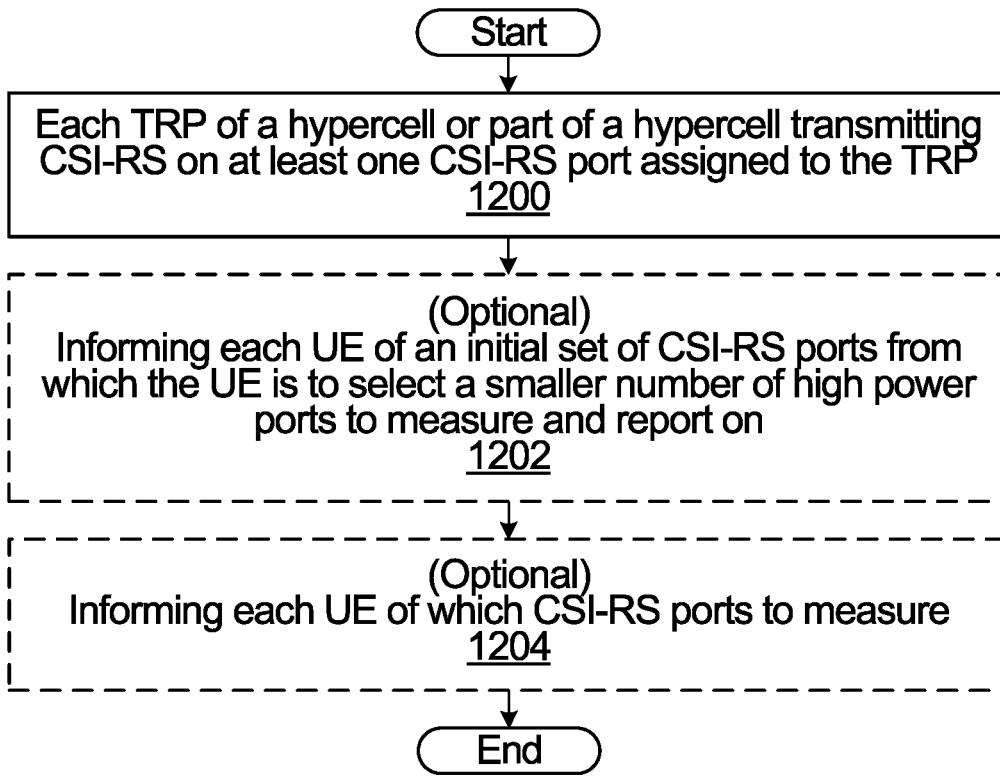

FIG. 12 is a flowchart of a method for execution by TRPs of a hypercell provided by an embodiment of the invention. The method begins at 1200 with each TRP of the hypercell or part of a hypercell transmitting CSI-RS on at least one CSI-RS port assigned to the TRP. Optionally, the method continues at 1202 with informing each UE of an initial set of CSI-RS ports from which the UE is to select a smaller number of high power ports to measure and report on. Optionally, the method continues at 1204 with informing each UE of which CSI-RS ports to measure.

Figure 13:
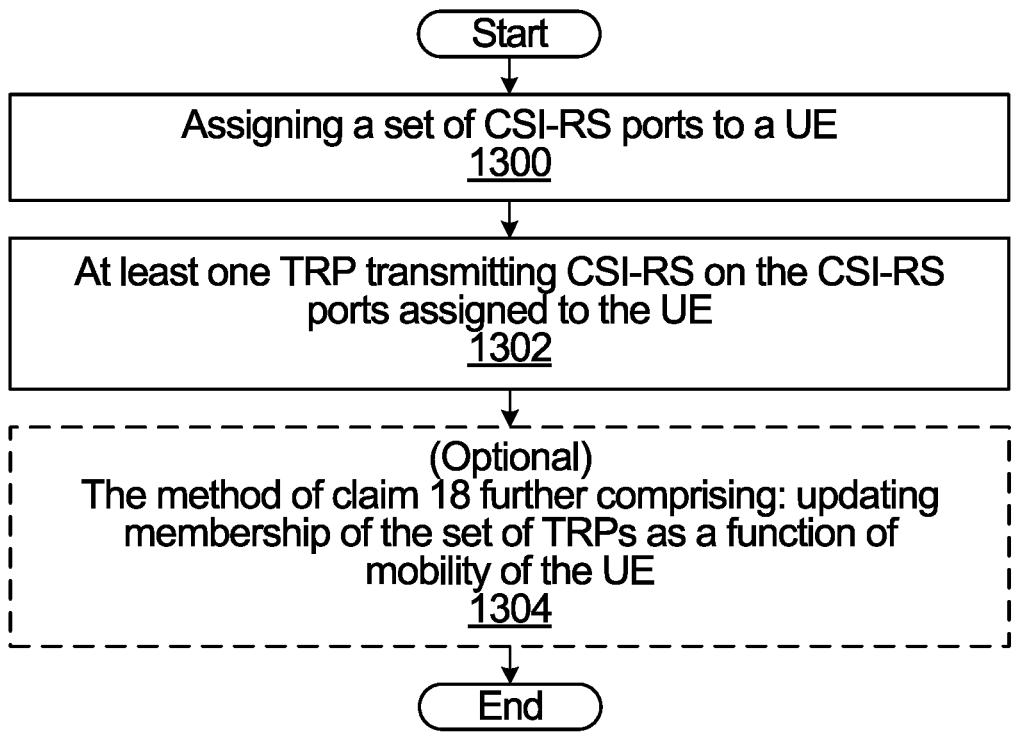

FIG. 13 is a flowchart of a method for execution by a network provided by an embodiment of the invention. The method begins at 1300 with assigning a set of CSI-RS ports to a UE. The method continues at 1302 with at least one TRP transmitting CSI-RS on the CSI-RS ports assigned to the UE. Optionally, the method continues at 1304 with updating membership of the set of TRPs as a function of mobility of the UE.

Figure 14:
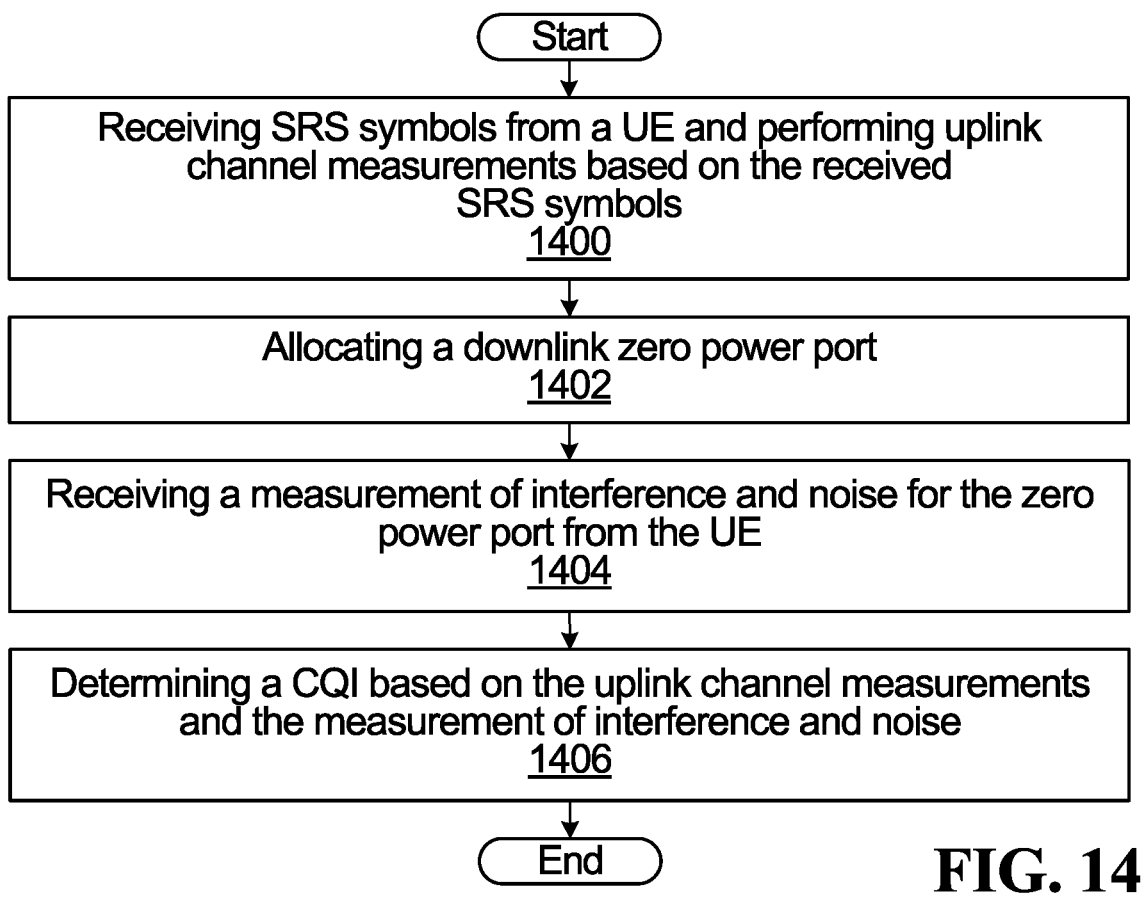

FIG. 14 is a flowchart of a method for execution by a network provided by an embodiment of the invention. The method begins with receiving SRS symbols from a UE and performing uplink channel measurements based on the received SRS symbols at 1400. The method continues at 1402 with allocating a downlink zero power port. The method continues at 1404 with receiving a measurement of interference and noise for the zero power port from the UE, and at 1406 with determining a CQI based on the uplink channel measurements and the measurement of interference and noise.

Figure 15:
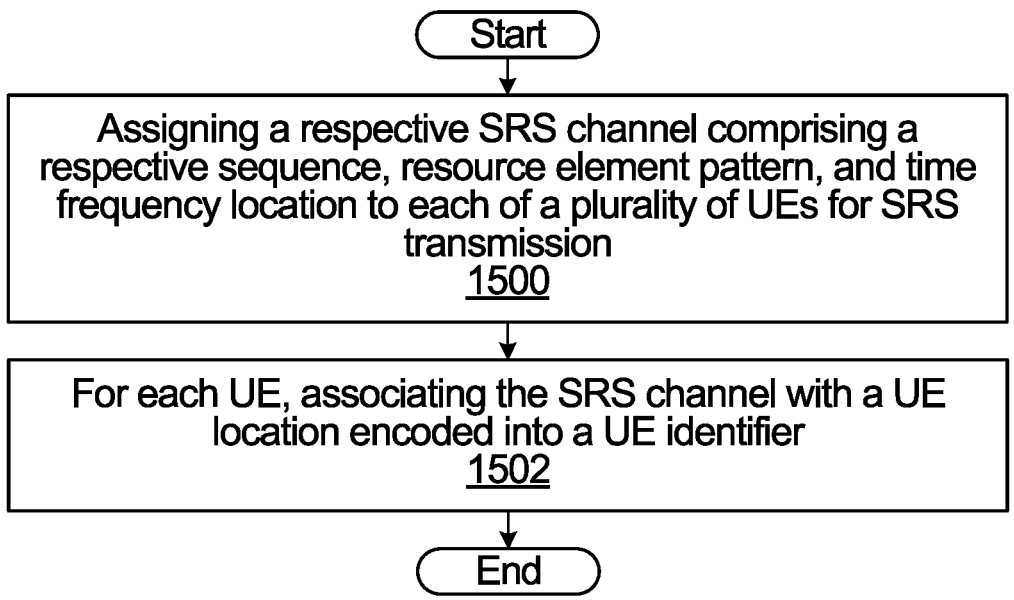

FIG. 15 is a flowchart of a method for execution by a network provided by an embodiment of the invention. The method begins at 1500 with assigning a respective SRS channel comprising a respective sequence, resource element pattern, and time frequency location to each of a plurality of UEs for SRS transmission. The method continues at 1502 with, for each UE, associating the SRS channel with a UE location encoded into a UE identifier.

Figure 16:
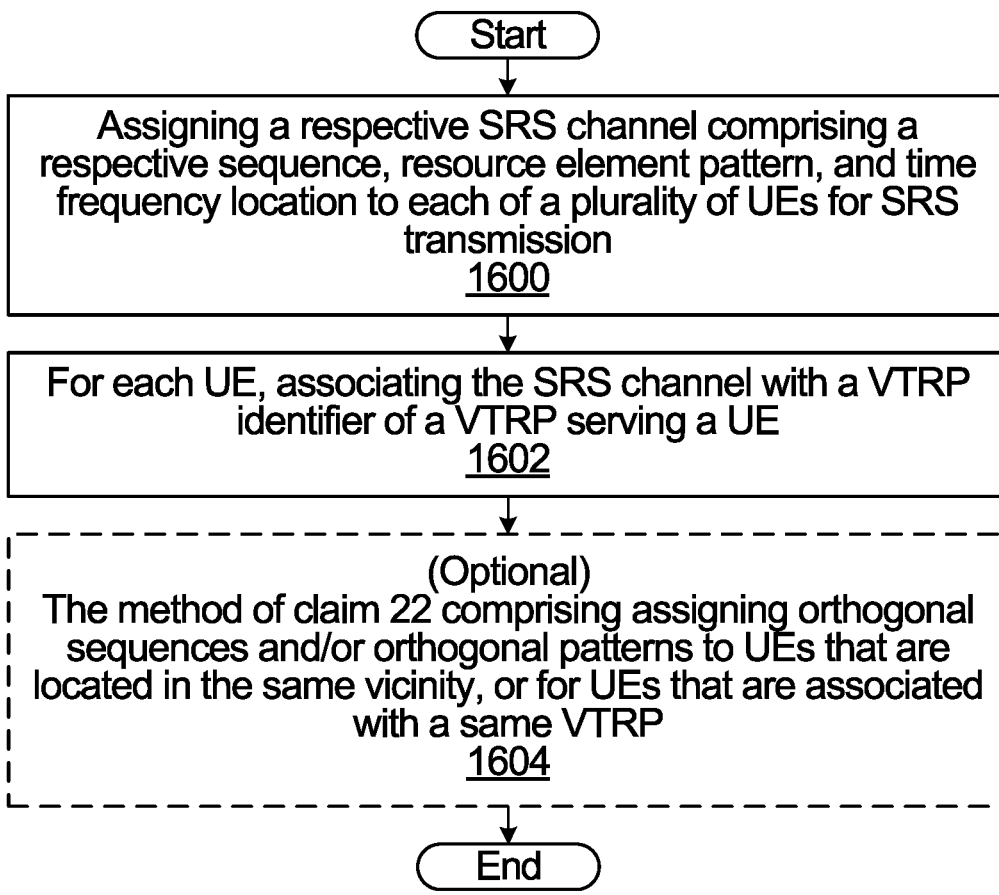

FIG. 16 is a flowchart of a method for execution by a network provided by an embodiment of the invention. The method begins at 1600 with assigning a respective SRS channel comprising a respective sequence, resource element pattern, and time frequency location to each of a plurality of UEs for SRS transmission. The method continues at 1602 with, for each UE, associating the SRS channel with a VTRP identifier of a VTRP serving a UE. Optionally, the method continues at 1604 with assigning orthogonal sequences and/or orthogonal patterns to UEs that are located in the same vicinity, or for UEs that are associated with a same VTRP.

Figure 17:
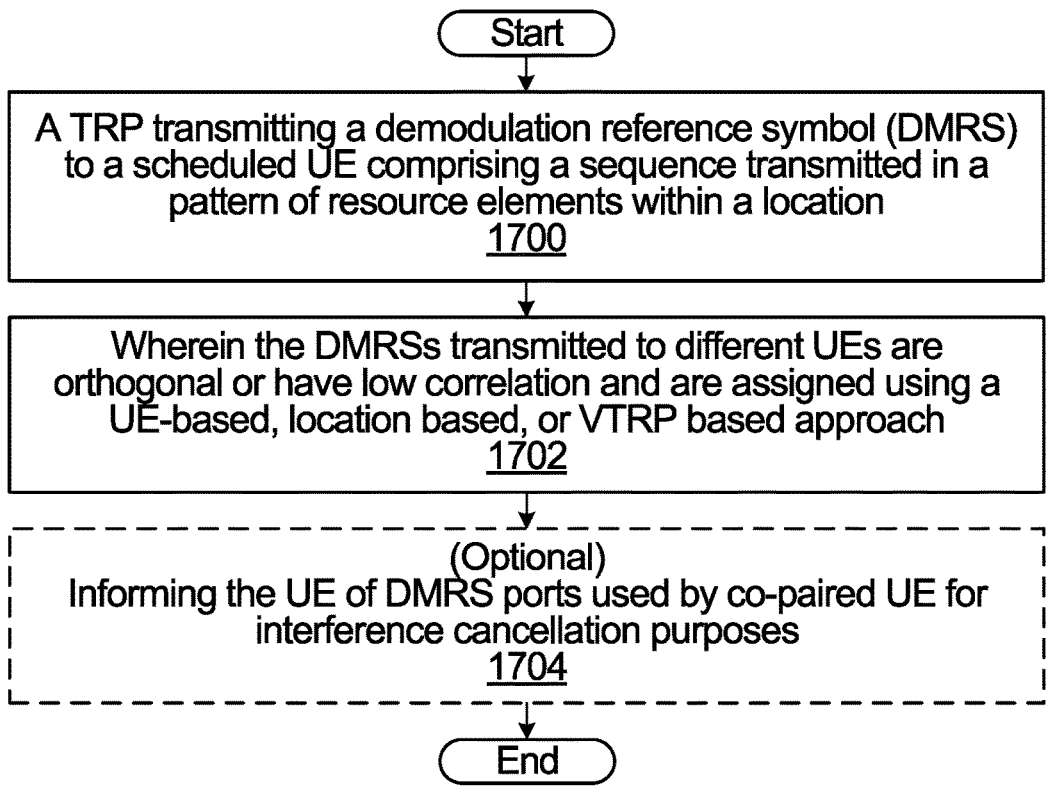

FIG. 17 is a flowchart of a method for execution by a network provided by an embodiment of the invention. The method begins at 1700 with a TRP transmitting a demodulation reference symbol (DMRS) to a scheduled UE comprising a sequence transmitted in a pattern of resource elements within a location. The DMRSs transmitted to different UEs are orthogonal or have low correlation and are assigned using a UE-based, location based, or VTRP based approach, as indicated at 1702. Optionally, the method further comprises informing the UE of DMRS ports used by co-paired UE for interference cancellation purposes, at 1704.

Figure 18:
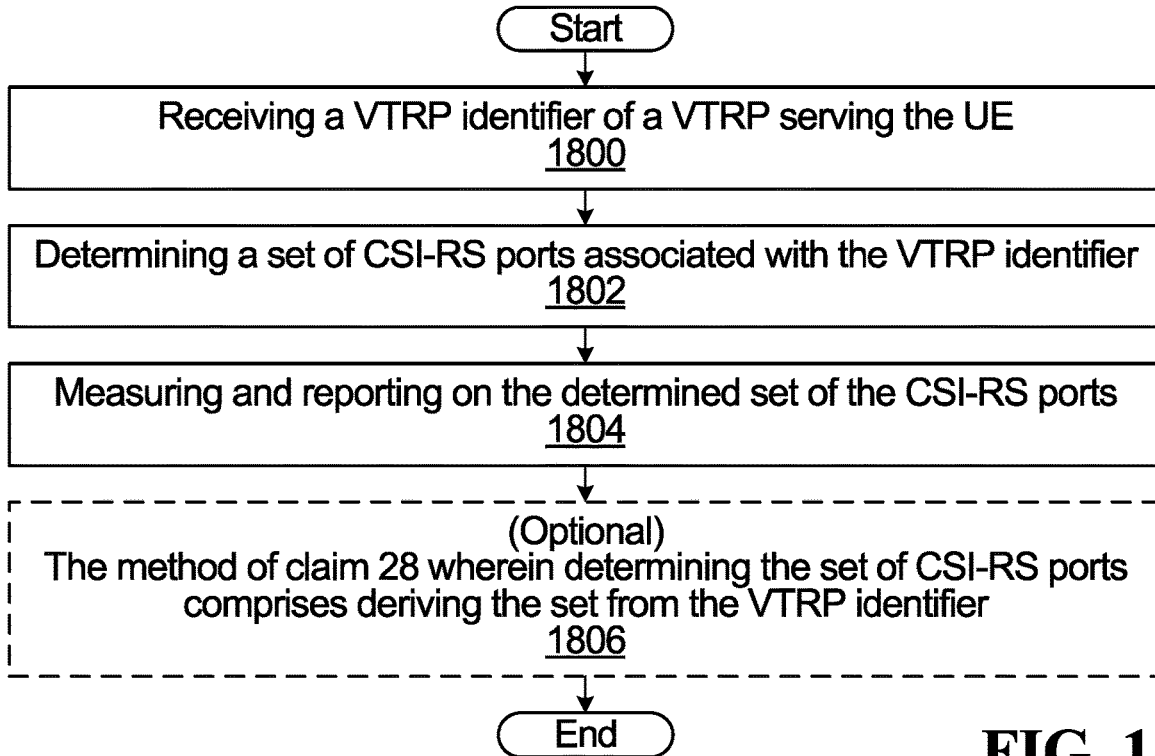

FIG. 18 is a flowchart of a method for execution by a UE provided by an embodiment of the invention. The method begins at 1800 with receiving a VTRP identifier of a VTRP serving the UE. The method continues at 1802 with determining a set of CSI-RS ports associated with the VTRP identifier, and at 1804 with measuring and reporting on the determined set of the CSI-RS ports. Optionally, the method further involves determining the set of CSI-RS ports comprises deriving the set from the VTRP identifier at 1806.

Figure 19:
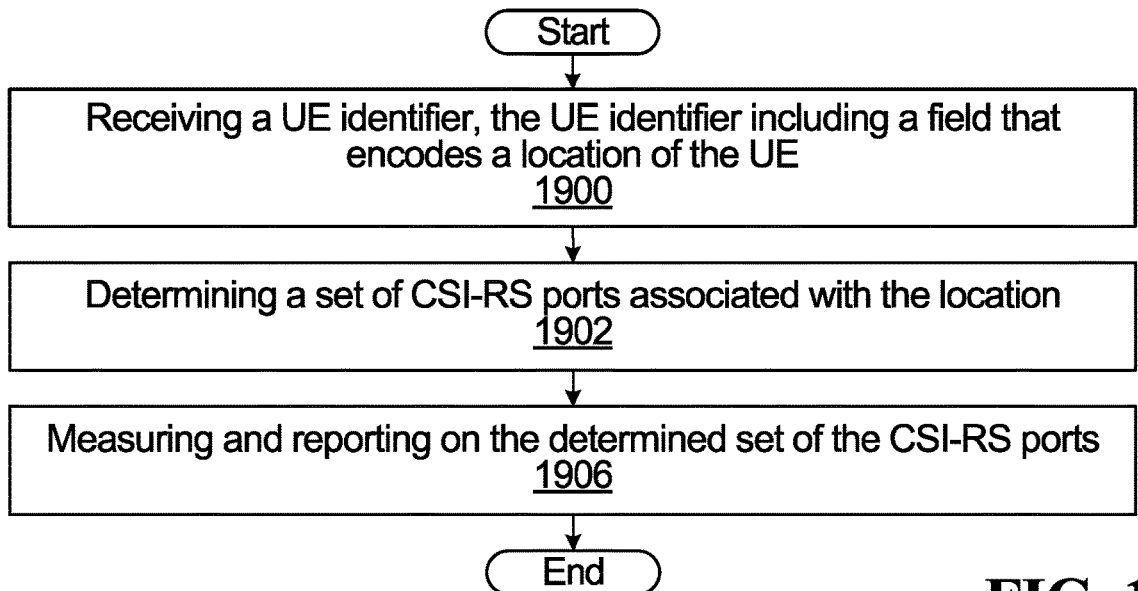

FIG. 19 is a flowchart of a method for execution by a UE provided by an embodiment of the invention. The method begins at 1900 with receiving a UE identifier, the UE identifier including a field that encodes a location of the UE. The method continues at 1902 with determining a set of CSI-RS ports associated with the location, and at 1904 with measuring and reporting on the determined set of the CSI-RS ports.

Figure 20:
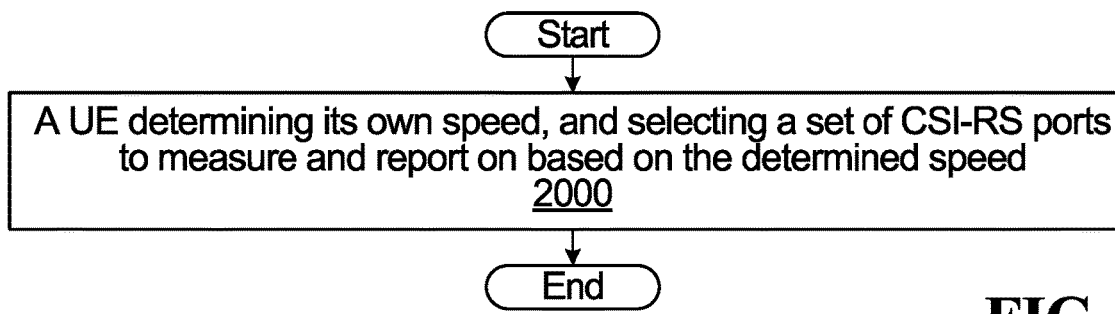

FIG. 20 is a flowchart of a method for execution by a UE provided by an embodiment of the invention. The method begins at 2000 with a UE determining its own speed, and selecting a set of CSI-RS ports to measure and report on based on the determined speed.

Figure 21:
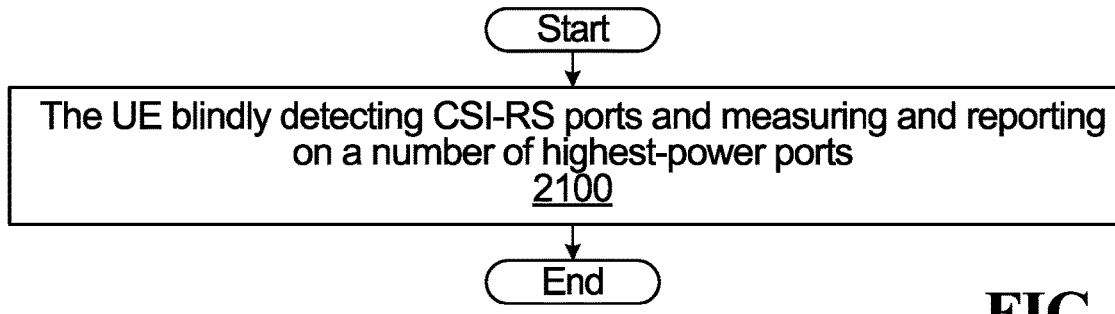

FIG. 21 is a flowchart of a method for execution by a UE provided by an embodiment of the invention. The method begins at 2100 with the UE blindly detecting CSI-RS ports and measuring and reporting on a number of highest-power ports.

Figure 22:
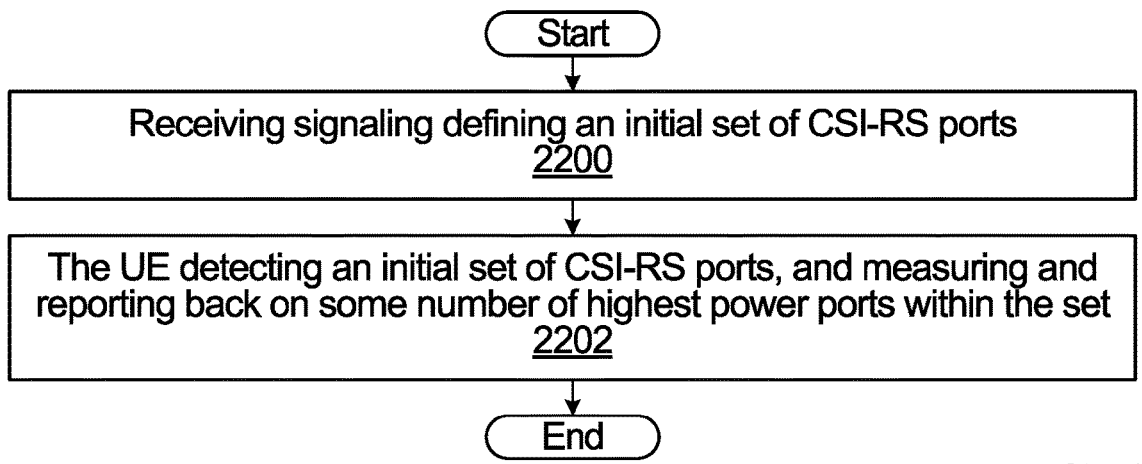

FIG. 22 is a flowchart of a method for execution by a UE provided by an embodiment of the invention. The method begins at 2200 with receiving signaling defining an initial set of CSI-RS ports. The method continues at 2202 with the UE detecting an initial set of CSI-RS ports, and measuring and reporting back on some number of highest power ports within the set.

Figure 23:
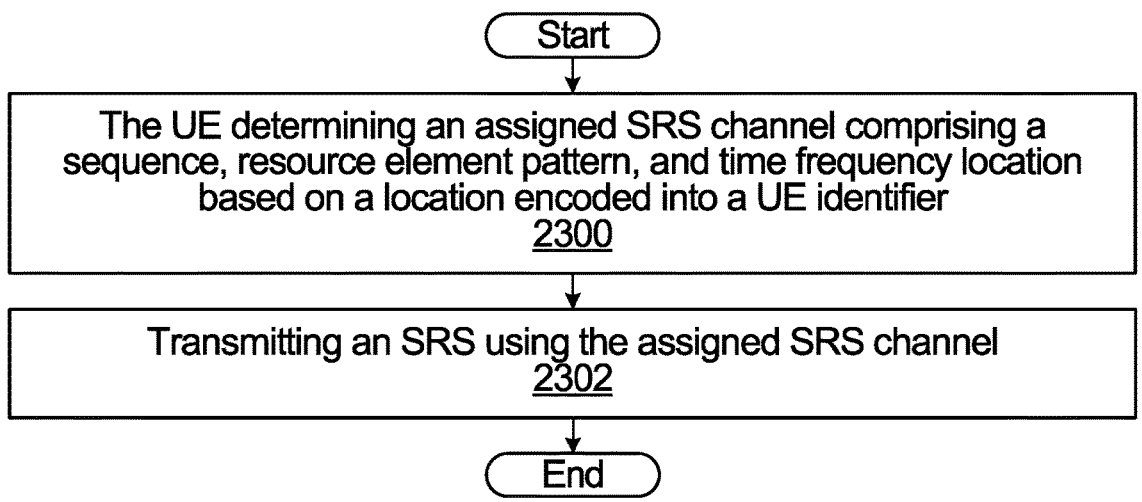

FIG. 23 is a flowchart of a method for execution by a UE provided by an embodiment of the invention. The method begins at 2300 with the UE determining an assigned SRS channel comprising a sequence, resource element pattern, and time frequency location based on a location encoded into a UE identifier. The method continues at 2302 with transmitting an SRS using the assigned SRS channel.

Figure 24:
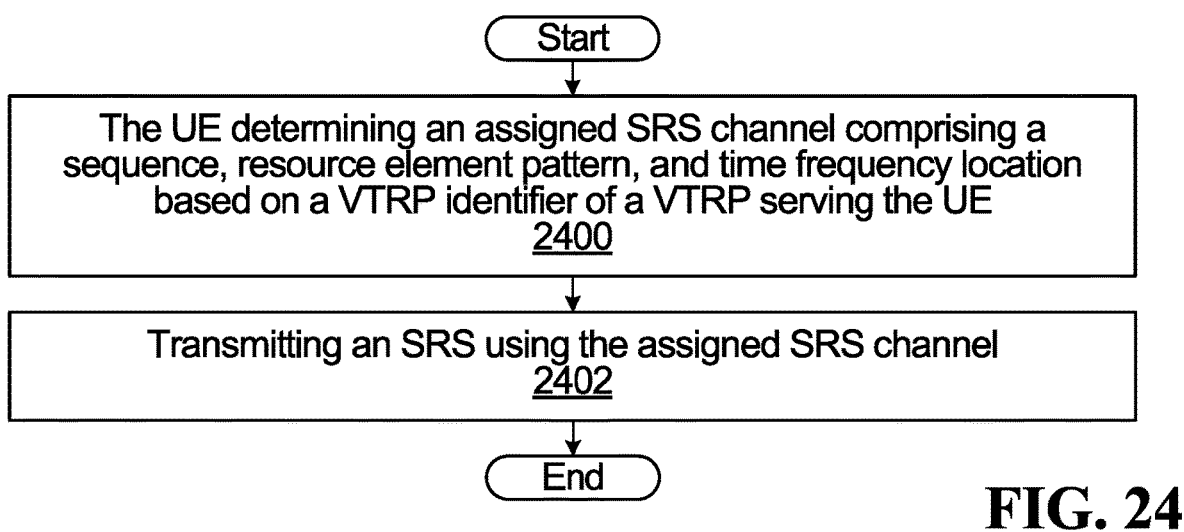

FIG. 24 is a flowchart of a method for execution by a UE provided by an embodiment of the invention. The method begins at 2400 with the UE determining an assigned SRS channel comprising a sequence, resource element pattern, and time frequency location based on a VTRP identifier of a VTRP serving the UE. The method continues at 2402 with transmitting an SRS using the assigned SRS channel.

Figure 25:
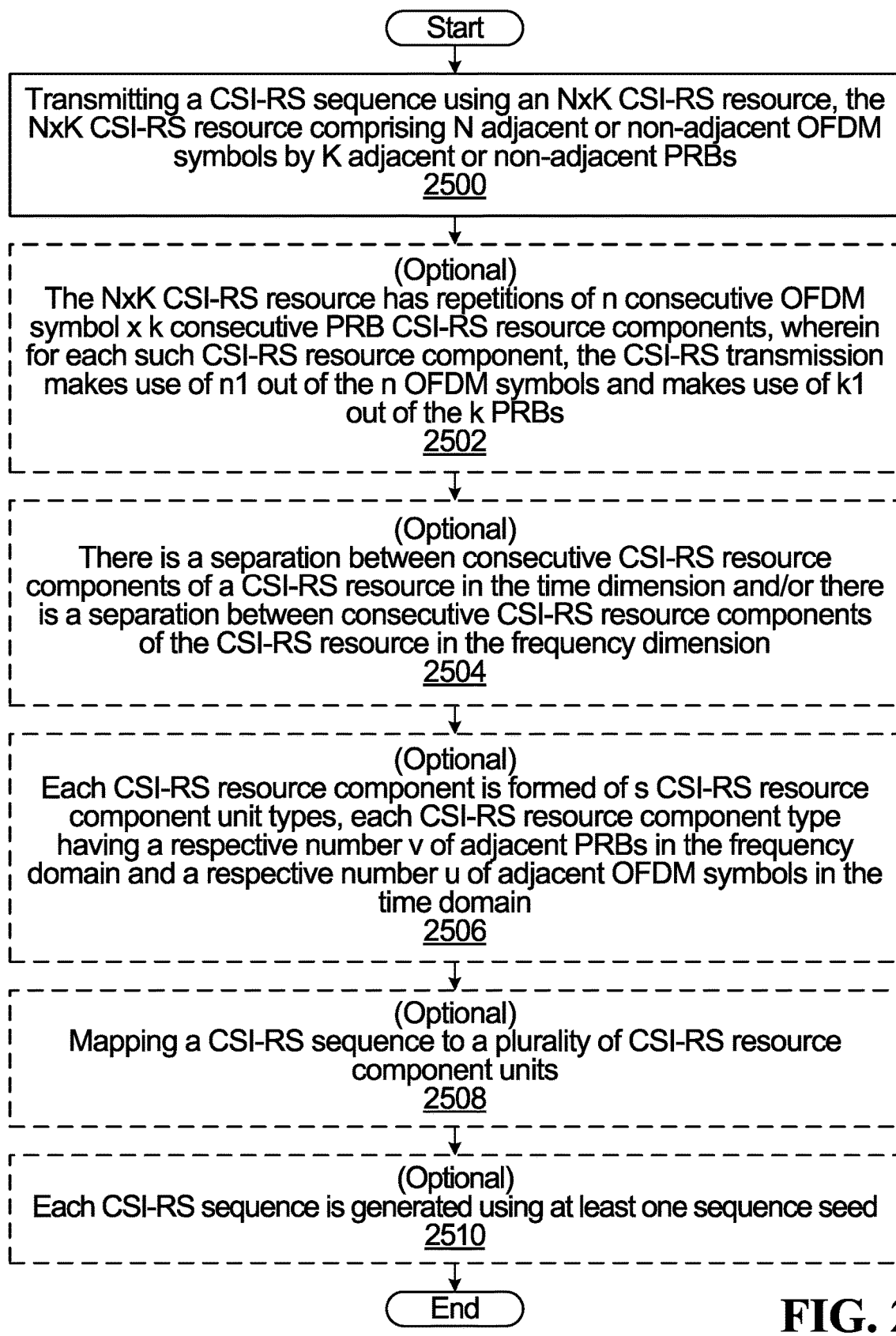

FIG. 25 is a flowchart of a method for execution by a network provided by an embodiment of the invention. The method begins at 2500 with transmitting a CSI-RS sequence using an N×K CSI-RS resource, the N×K CSI-RS resource comprising N adjacent or non-adjacent OFDM symbols by K adjacent or non-adjacent PRBs. Optionally, the N×K CSI-RS resource has repetitions of n consecutive OFDM symbol×k consecutive PRB CSI-RS resource components, wherein for each such CSI-RS resource component, the CSI-RS transmission makes use of $n_1$ out of the n OFDM symbols and makes use of $k_1$ out of the k PRBs, as indicated at 2502. Optionally, there is a separation between consecutive CSI-RS resource components of a CSI-RS resource in the time dimension and/or there is a separation between consecutive CSI-RS resource components of the CSI-RS resource in the frequency dimension, as indicated at 2504. Optionally, each CSI-RS resource component is formed of s CSI-RS resource component unit types, each CSI-RS resource component type having a respective number v of adjacent PRBs in the frequency domain and a respective number u of adjacent OFDM symbols in the time domain, as indicated at 2506. Optionally, the method further involves mapping a CSI-RS sequence to a plurality of CSI-RS resource component units at 2508. Optionally, each CSI-RS sequence is generated using at least one sequence seed as at 2510.

Figure 26:
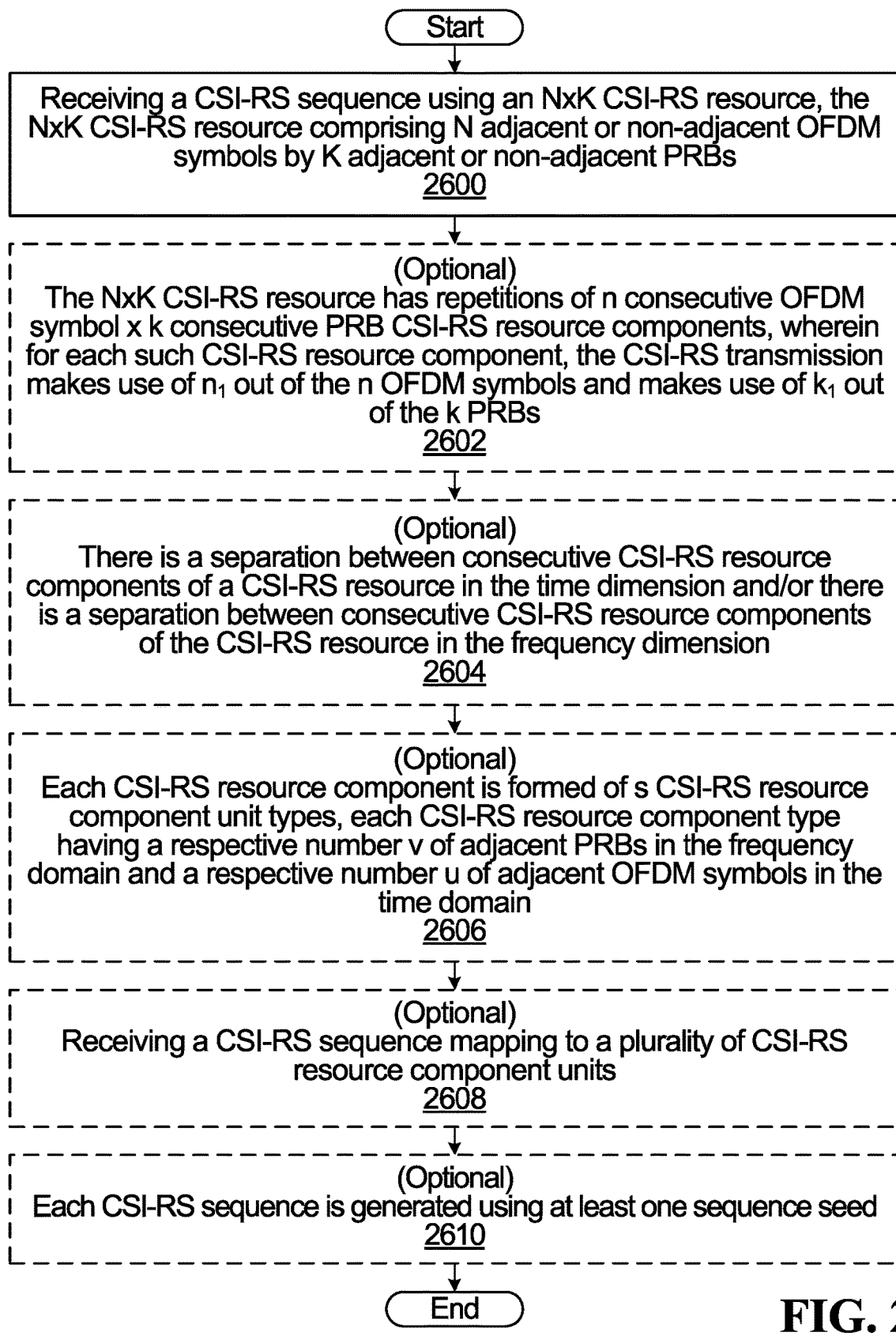

FIG. 26 is a flowchart of a method for execution by a UE provided by an embodiment of the invention. The method begins at 2600 with receiving a CSI-RS sequence using an N×K CSI-RS resource, the N×K CSI-RS resource comprising N adjacent or non-adjacent OFDM symbols by K adjacent or non-adjacent PRBs. Optionally, the N×K CSI-RS resource has repetitions of n consecutive OFDM symbol×k consecutive PRB CSI-RS resource components, wherein for each such CSI-RS resource component, the CSI-RS transmission makes use of $n_1$ out of the n OFDM symbols and makes use of $k_1$ out of the k PRBs, as indicated at 2602. Optionally, there is a separation between consecutive CSI-RS resource components of a CSI-RS resource in the time dimension and/or there is a separation between consecutive CSI-RS resource components of the CSI-RS resource in the frequency dimension, as indicated at 2604. Optionally, each CSI-RS resource component is formed of s CSI-RS resource component unit types, each CSI-RS resource component type having a respective number v of adjacent PRBs in the frequency domain and a respective number u of adjacent OFDM symbols in the time domain, as indicated at 2606. Optionally, the method further involves mapping a CSI-RS sequence to a plurality of CSI-RS resource component units at 2608. Optionally, each CSI-RS sequence is generated using at least one sequence seed as at 2610.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method in a user equipment, the method comprising:
receiving, by a receiver using a single channel state information-reference signal (CSI-RS) port, a CSI-RS sequence that has been transmitted over a wireless channel using an N×K CSI-RS resource, the N×K CSI-RS resource comprising N adjacent or non-adjacent orthogonal frequency division multiplexing (OFDM) symbols by K adjacent or non-adjacent physical resource blocks (PRBs), where N and K are positive integers, wherein
the N×K CSI-RS resource has repetitions of CSI-RS resource components, each CSI-RS resource component being within a respective time-frequency space defined by n consecutive OFDM symbols in the time dimension and k consecutive PRBs in the frequency dimension, wherein for each CSI-RS resource component, transmission of the CSI-RS sequence makes use of $n_1$ out of the n OFDM symbols and makes use of $k_1$ out of the k PRBs, where n, k, $n_1$, $k_1$ are positive integers, and
there is a separation, in the frequency dimension, of m PRBs between the k PRBs of consecutive CSI-RS resource components of the N×K CSI-RS resource, where m is a positive integer; and
determining channel state information (CSI) for the wireless channel based on the CSI-RS sequence.

2. The method of claim 1 wherein there is a separation between consecutive CSI-RS resource components of the N×K CSI-RS resource in the time dimension.

3. The method of claim 1 wherein each CSI-RS resource component is formed of s different CSI-RS resource component unit types, each CSI-RS resource component unit type having a respective number v of adjacent REs in the frequency domain and a respective number u of adjacent OFDM symbols in the time domain, where u and v are positive integers, and s is a positive integer greater than one.

4. The method of claim 1 further comprising:
receiving a CSI-RS sequence mapped to a plurality of CSI-RS resource component units.

5. The method of claim 4 wherein each CSI-RS sequence is generated using at least one sequence seed.

6. The method of claim 5 wherein the at least one sequence seed is network configurable.

7. The method of claim 5 wherein the at least one sequence seed is dependent upon cell identifier and/or at least one UE specific parameter.

8. The method of claim 5 further wherein the CSI-RS sequence is scrambled using a cell specific sequence.

9. The method of claim 5 wherein CSI-RS sequence is scrambled using a UE specific sequence.

10. The method of claim 4 wherein multiple CSI-RS sequences are mapped to at least partially overlapping sets of CSI-RS resource component units, the multiple CSI-RS sequences being orthogonal or having low cross-correlation on the overlapping CSI-resource components.

11. The method of claim 4 wherein resource elements used for CSI-RS resource component units are dedicated to CSI-RS transmission and no data or control signal will be sent on these REs.

12. The method of claim 1 wherein only those OFDM symbols in the time domain and PRBs in the frequency domain that include a part of a CSI-RS resource component are dedicated to CSI-RS transmission only, with remaining other PRBs and OFDM symbols on the time frequency plane that are covered by N by K CSI-RS resource are available for use for transmission of data or control signalling.

13. The method of claim 4 wherein one or a combination of wideband, partial band, and narrowband CSI-RS resource allocations are configured.

14. The method of claim 13 further comprising receiving an assignment of multiple CSI-RS resources with different configurations at different parts of the frequency band.

15. A method comprising:
transmitting, by a transmitter using a single channel state information-reference signal (CSI-RS) port, a CSI-RS sequence over a wireless channel using an N×K CSI-RS resource, the N×K CSI-RS resource comprising N adjacent or non-adjacent orthogonal frequency division multiplexing (OFDM) symbols by K adjacent or non-adjacent physical resource blocks (PRBs), where N and K are positive integers, wherein
the N×K CSI-RS resource has repetitions of CSI-RS resource components, each CSI-RS resource component being within a respective time-frequency space defined by n consecutive OFDM symbols in the time dimension and k consecutive PRBs in the frequency dimension, wherein for each CSI-RS resource component, transmission of the CSI-RS sequence makes use of $n_1$ out of the n OFDM symbols and makes use of $k_1$ out of the k PRBs, where n, k, $n_1$, $k_1$ are positive integers, and
there is a separation, in the frequency dimension, of m PRBs between the k PRBs of consecutive CSI-RS resource components of the N×K CSI-RS resource, where m is a positive integer.

16. The method of claim 15, wherein there is a separation between consecutive CSI-RS resource components of the N×K CSI-RS resource in the time dimension.

17. The method of claim 15 wherein each CSI-RS resource component is formed of s different CSI-RS resource component unit types, each CSI-RS resource component unit type having a respective number v of adjacent REs in the frequency domain and a respective number u of adjacent OFDM symbols in the time domain, where u and v are positive integers, and s is a positive integer greater than one.

18. The method of claim 15 further comprising:
mapping a CSI-RS sequence to a plurality of CSI-RS resource component units.

19. The method of claim 18 wherein each CSI-RS sequence is generated using at least one sequence seed.

20. The method of claim 19 wherein the at least one sequence seed is network configurable.

21. The method of claim 19 wherein the at least one sequence seed is dependent upon cell identifier and/or at least one UE specific parameter.

22. The method of claim 19 further comprising:
further scrambling the CSI-RS sequence using a cell specific sequence.

23. The method of claim 19 further comprising:
further scrambling the CSI-RS sequence using a UE specific sequence.

24. The method of claim 18 comprising mapping multiple CSI-RS sequences to at least partially overlapping sets of CSI-RS resource component units, the multiple CSI-RS sequences being orthogonal or having low cross-correlation on the overlapping CSI-resource components.

25. The method of claim 18 wherein resource elements used for CSI-RS resource component units are dedicated to CSI-RS transmission and no data or control signal will be sent on these REs.

26. The method of claim 15 wherein only those OFDM symbols in the time domain and PRBs in the frequency domain that include a part of a CSI-RS resource component are dedicated to CSI-RS transmission only, with remaining other PRBs and OFDM symbols on the time frequency plane that are covered by N by K CSI-RS resource are available for use for transmission of data or control signalling.

27. The method of claim 18 further comprising configuring one or a combination of wideband, partial band, and narrowband CSI-RS resource allocations.

28. The method of claim 27 further comprising assigning a UE multiple CSI-RS resources with different configurations at different parts of the frequency band.

29. A TRP or group of TRPs configured to implement the method of claim 15.

30. A UE configured to implement the method of claim 1.

* * * * *

UNITED STATES PATENT AND TRADEMARK OFFICE
CERTIFICATE OF CORRECTION

PATENT NO. : 10,680,855 B2
APPLICATION NO. : 15/588499
DATED : June 9, 2020
INVENTOR(S) : Mohammadhadi Baligh et al.

It is certified that error appears in the above-identified patent and that said Letters Patent is hereby corrected as shown below:

In the Claims

At Column 22, Line 2, Claim 4:
"receiving a CSI-RS sequence mapped to a plurality of"
Should be:
-- receiving the CSI-RS sequence mapped to a plurality of --

At Column 22, Line 4, Claim 5:
"The method of claim 4 wherein each CSI-RS sequence"
Should be:
-- The method of claim 4 wherein the CSI-RS sequence --

At Column 22, Line 8, Claim 7:
"sequence seed is dependent upon cell identifier and/or at"
Should be:
-- sequence seed is dependent upon a cell identifier and/or at --

At Column 22, Line 13, Claim 9:
"The method of claim 5 wherein CSI-RS sequence is"
Should be:
-- The method of claim 5 wherein the CSI-RS sequence is --

At Column 22, Line 21, Claim 11:
"used for CSI-RS resource component units are dedicated to"
Should be:
-- used for the CSI-RS resource component units are dedicated to --

At Column 22, Line 26, Claim 12:
"domain that include a part of a CSI-RS resource component"
Should be:

Signed and Sealed this
Twenty-third Day of May, 2023

Katherine Kelly Vidal
*Director of the United States Patent and Trademark Office*

-- domain that include a part of one of the CSI-RS resource components --

At Column 22, Line 29, Claim 12:
"that are covered by N by K CSI-RS resource are available"
Should be:
-- that are covered by the NxK CSI-RS resource are available --

At Column 22, Line 36, Claim 14:
"configurations at different parts of the frequency band."
Should be:
-- configurations at different parts of a frequency band. --

At Column 23, Line 5, Claim 18:
"mapping a CSI-RS sequence to a plurality of CSI-RS"
Should be:
-- mapping the CSI-RS sequence to a plurality of CSI-RS --

At Column 23, Line 7, Claim 19:
"The method of claim 18 wherein each CSI-RS"
Should be:
-- The method of claim 18 wherein the CSI-RS --

At Column 23, Line 12, Claim 21:
"sequence seed is dependent upon cell identifier and/or at"
Should be:
-- sequence seed is dependent upon a cell identifier and/or at --

At Column 24, Line 4, Claim 25:
"used for CSI-RS resource component units are dedicated to"
Should be:
-- used for the CSI-RS resource component units are dedicated to --

At Column 24, Line 9, Claim 26:
"domain that include a part of a CSI-RS resource component"
Should be:
-- domain that include a part of one of the CSI-RS resource components --

At Column 24, Line 12, Claim 26:
"that are covered by N by K CSI-RS resource are available"
Should be:
-- that are covered by the NxK CSI-RS resource are available --

At Column 24, Line 19, Claim 28:
"configurations at different parts of the frequency band."
Should be:
-- configurations at different parts of a frequency band. --